(12) United States Patent
Wang et al.

(10) Patent No.: US 8,880,983 B2
(45) Date of Patent: *Nov. 4, 2014

(54) COMMUNICATION DEVICE EMPLOYING BINARY PRODUCT CODING WITH SELECTIVE ADDITIONAL CYCLIC REDUNDANCY CHECK (CRC) THEREIN

(71) Applicant: Broadcom Corporation, Irvine, CA (US)

(72) Inventors: Zhongfeng Wang, Irvine, CA (US); Chung-Jue Chen, Irvine, CA (US); Kang Xiao, Irvine, CA (US); Hongtao Jiang, Irvine, CA (US); James R. Fife, Corona Del Mar, CA (US); Sudeep Bhoja, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/063,778

(22) Filed: Oct. 25, 2013

(65) Prior Publication Data

US 2014/0053042 A1 Feb. 20, 2014

Related U.S. Application Data

(63) Continuation of application No. 12/726,062, filed on Mar. 17, 2010, now Pat. No. 8,572,460.

(60) Provisional application No. 61/161,030, filed on Mar. 17, 2009, provisional application No. 61/170,593, filed on Apr. 17, 2009.

(51) Int. Cl.
*H03M 13/00* (2006.01)
*H04L 1/00* (2006.01)
*G06F 11/10* (2006.01)

(52) U.S. Cl.
CPC ............. *G06F 11/10* (2013.01); *H04L 1/0064* (2013.01); *H04L 1/005* (2013.01)
USPC ............................................ 714/780; 714/758

(58) Field of Classification Search
CPC ............. H04L 1/005; H03M 13/6306; H03M 13/2963; G11C 16/26; G11C 16/34; G06F 11/10
USPC ............................................... 714/780, 758
See application file for complete search history.

(56) References Cited

U.S. PATENT DOCUMENTS

| 6,065,147 A * | 5/2000 | Pyndiah et al. | 714/755 |
| 6,122,763 A * | 9/2000 | Pyndiah et al. | 714/755 |
| 6,161,209 A * | 12/2000 | Moher | 714/780 |

(Continued)

*Primary Examiner* — Esaw Abraham

(74) *Attorney, Agent, or Firm* — Garlick & Markison; Shayne X. Short

(57) ABSTRACT

Communication device employing binary product coding with selective additional cyclic redundancy check (CRC) therein. Product code encoding (e.g., employing row and column encoding of matrix formatted bits, selectively with interleaving and/or permutation of the bits therein) may be combined with additional error correction code (ECC) or forward error correction (FEC) coding thereby generating coded bits for use in generating a signal to be launched into a communication channel Various ECCs/FECs may be employed including a BCH (Bose and Ray-Chaudhuri, and Hocquenghem) code, a Reed-Solomon (RS) code, an LDPC (Low Density Parity Check) code, etc. The redundancy of such coded signals as generated using the principles herein is in the range of approximately 7%, and hard decision decoding may be performed on such coded signals generated herein. In accordance with decoding such (e.g., possibly by performing bit-flipping), various bit decisions (within certain iterations) may be selectively ignored and/or reverted back to previous bit decisions.

20 Claims, 17 Drawing Sheets

(56) References Cited

U.S. PATENT DOCUMENTS

| | | | |
|---|---|---|---|
| 7,630,269 B2* | 12/2009 | Oonuki et al. | 365/226 |
| 8,201,047 B2* | 6/2012 | Sakai et al. | 714/755 |
| 8,225,174 B2* | 7/2012 | Okamura | 714/758 |
| 8,255,763 B1* | 8/2012 | Yang et al. | 714/755 |
| 8,255,764 B1* | 8/2012 | Yeo et al. | 714/758 |
| 8,374,026 B2* | 2/2013 | Sharon et al. | 365/185.02 |

* cited by examiner

Fig. 4 (row encoding)

Fig. 5 (column encoding)

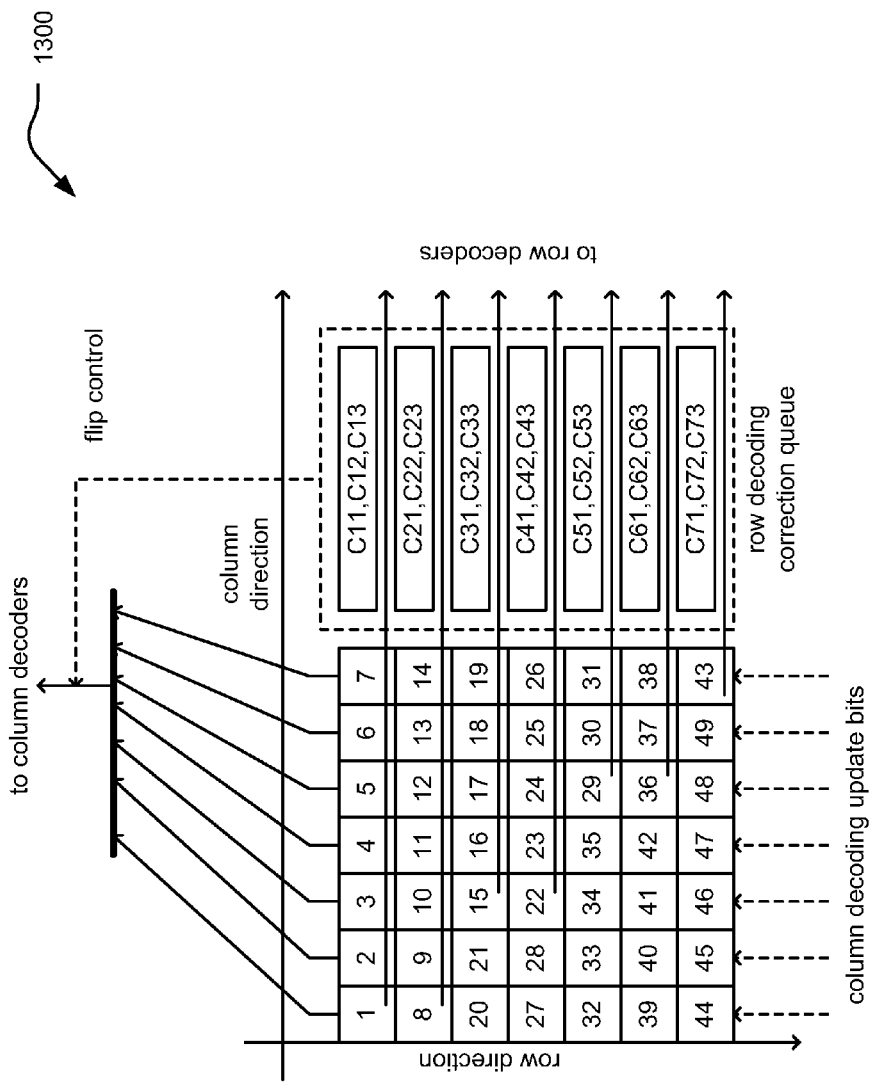
Fig. 13 (iterative decoding flow)

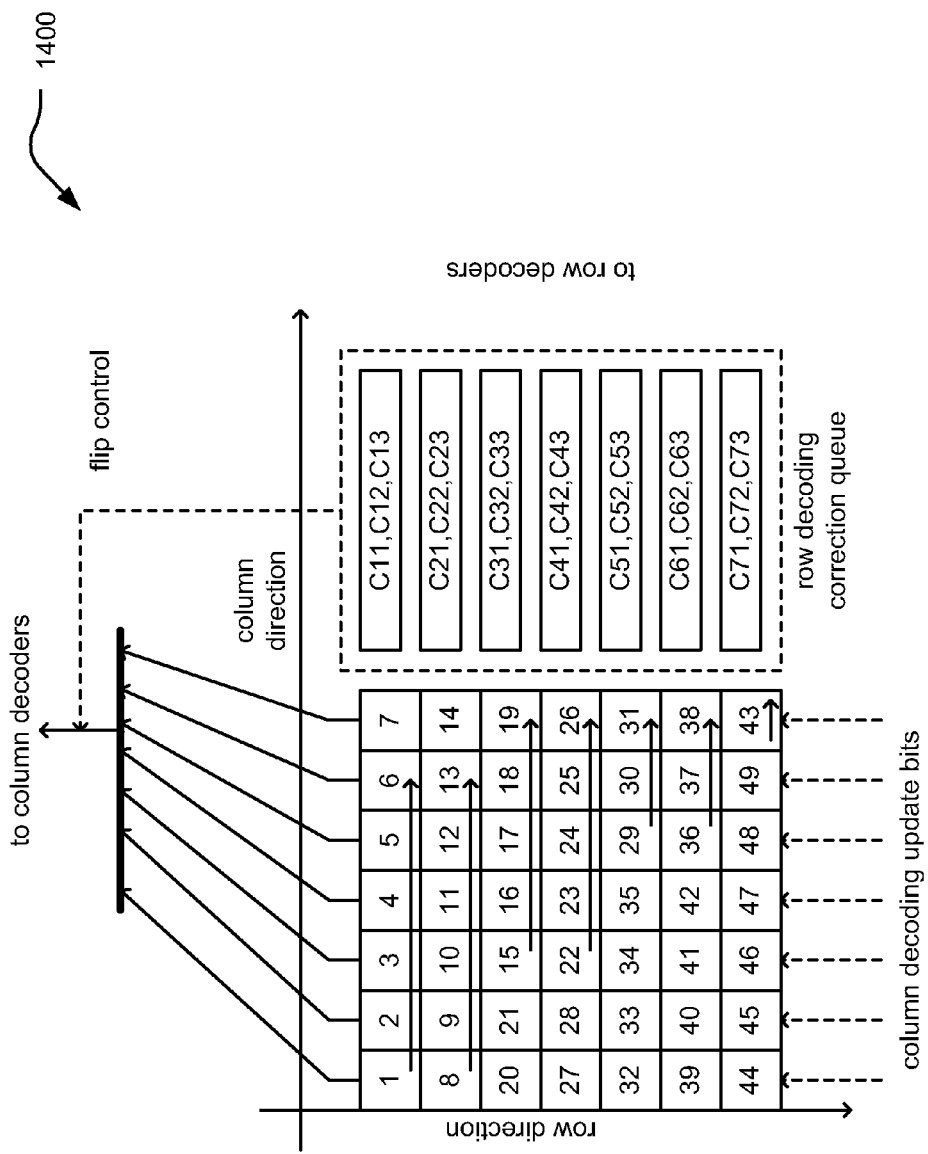
Fig. 14 (iterative modified decoding flow: row decoding correction)

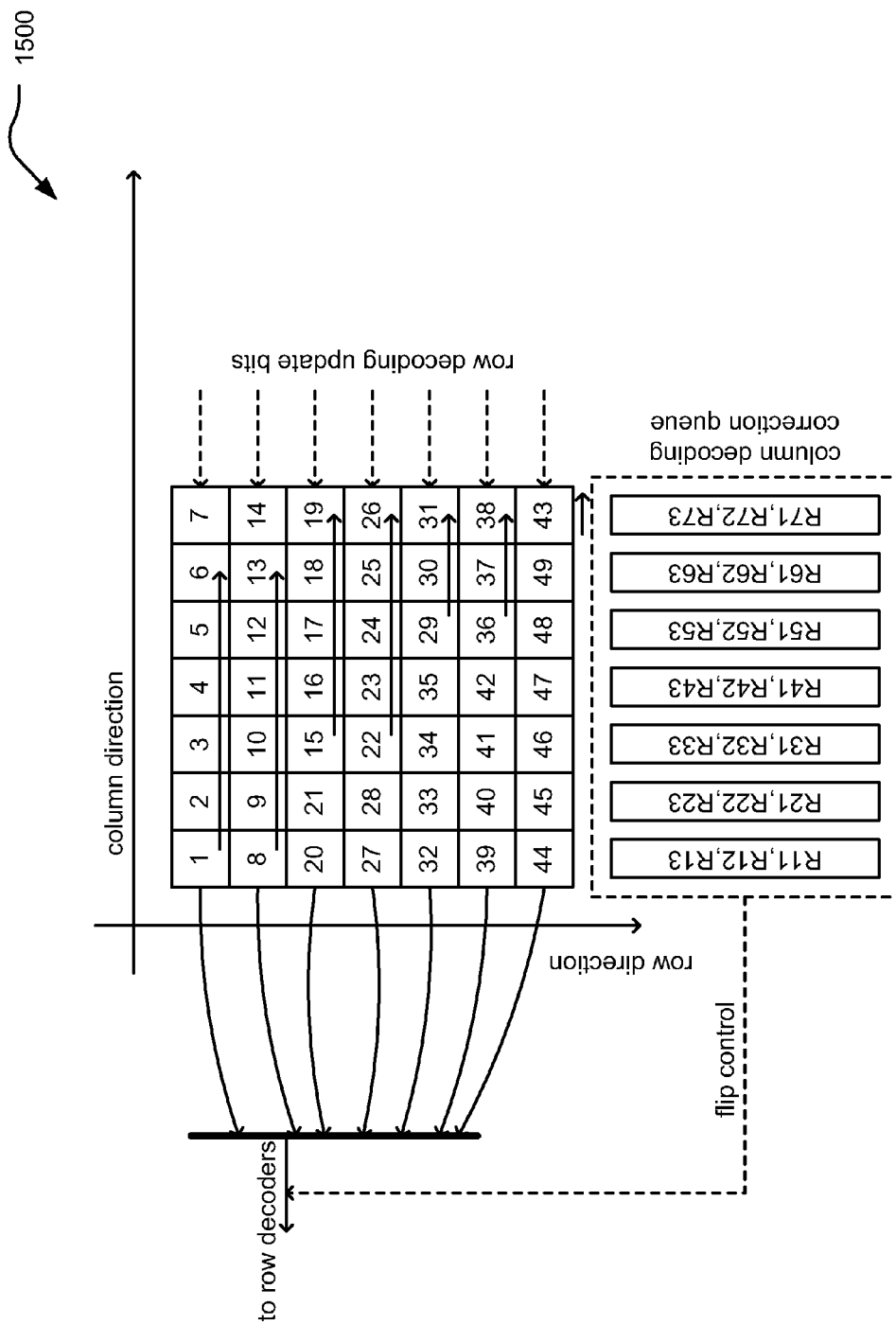
Fig. 15 (iterative modified decoding flow: column decoding correction)

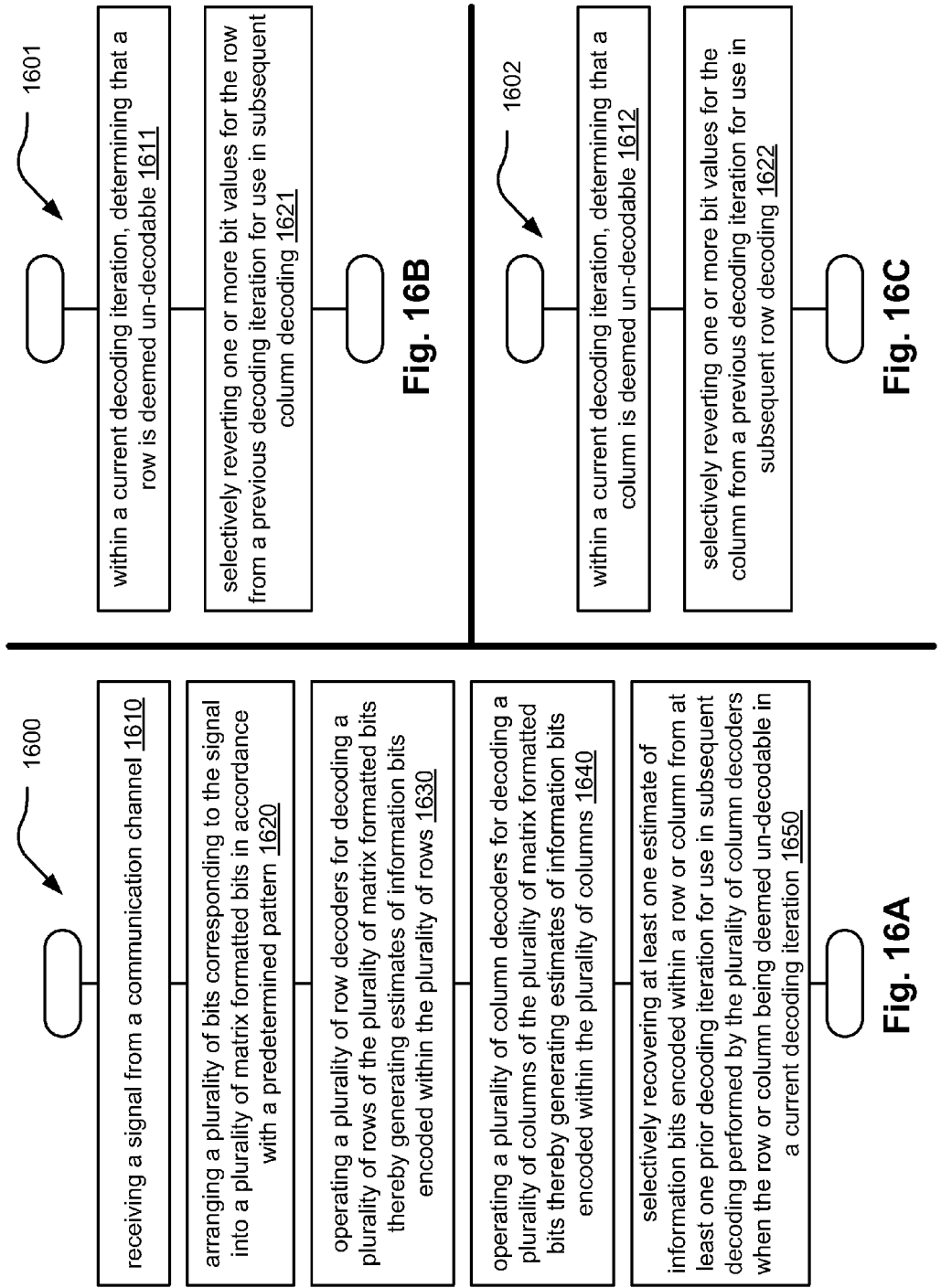

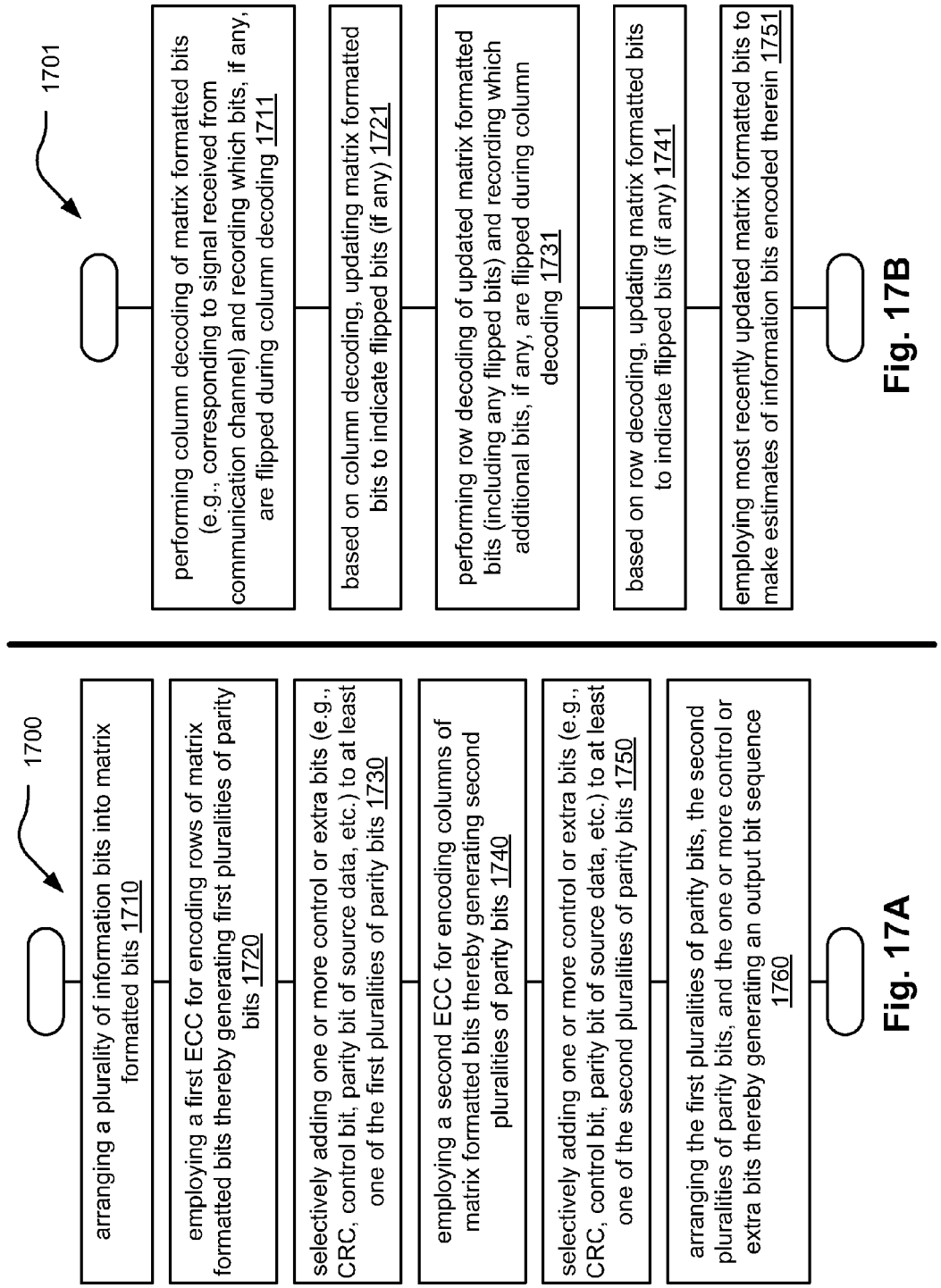

COMMUNICATION DEVICE EMPLOYING BINARY PRODUCT CODING WITH SELECTIVE ADDITIONAL CYCLIC REDUNDANCY CHECK (CRC) THEREIN

CROSS REFERENCE TO RELATED PATENTS/PATENT APPLICATIONS

Continuation Priority Claim, 35 U.S.C. §120

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:

1. U.S. Utility patent application Ser. No. 12/726,062, entitled "Communication device employing binary product coding with selective additional cyclic redundancy check (CRC) therein," filed Mar. 17, 2010, and scheduled subsequently to be issued as U.S. Pat. No. 8,572,460 on Oct. 29, 2013 (as indicated in an ISSUE NOTIFICATION mailed on Oct. 9, 2013) which claims priority pursuant to 35 U.S.C. §119(e) to the following U.S. Provisional Patent Applications which are hereby incorporated herein by reference in their entirety and made part of the present U.S. Utility patent application for all purposes:

a. U.S. Provisional Patent Application Ser. No. 61/161,030, entitled "Forward error correction (FEC) scheme for communications," filed Mar. 17, 2009.

b. U.S. Provisional Patent Application Ser. No. 61/170,593, entitled "Communication device employing binary product coding with selective additional cyclic redundancy check (CRC) therein," filed Apr. 17, 2009.

INCORPORATION BY REFERENCE

The following U.S. Utility Patent Application is hereby incorporated herein by reference in its entirety and is made part of the present U.S. Utility Patent Application for all purposes:

1. U.S. Utility application Ser. No. 12/725,887, entitled "Forward error correction (FEC) scheme for communications," filed Mar. 17, 2010, now U.S. Pat. No. 8,341,509 issued on Dec. 25, 2012, which claims priority pursuant to 35 U.S.C. §119(e) to the following U.S. Provisional patent application which is hereby incorporated herein by reference in its entirety and made part of the present U.S. Utility patent application for all purposes:

a. U.S. Provisional Application Ser. No. 61/161,030, entitled "Forward error correction (FEC) scheme for communications," filed Mar. 17, 2009.

BACKGROUND OF THE INVENTION

1. Technical Field of the Invention

The invention relates generally to communication devices; and, more particularly, it relates to communication devices that employ binary product coding with selective additional cyclic redundancy check (CRC) therein.

2. Description of Related Art

Data communication systems have been under continual development for many years. One such type of communication system that has been of significant interest lately is a communication system that employs iterative error correction codes (ECCs) that operate in accordance with forward error correction (FEC). There are a variety of types of ECCs including Reed-Solomon (RS) code, turbo codes, turbo trellis code modulation (TTCM) code, LDPC (Low Density Parity Check) code, etc. Communications systems with iterative codes are often able to achieve lower bit error rates (BER) than alternative codes for a given signal to noise ratio (SNR).

A continual and primary directive in this area of development has been to try continually to lower the SNR required to achieve a given BER within a communication system. The ideal goal has been to try to reach Shannon's limit in a communication channel. Shannon's limit may be viewed as being the data rate to be used in a communication channel, having a particular SNR that achieves error free transmission through the communication channel. In other words, the Shannon limit is the theoretical bound for channel capacity for a given modulation and code rate.

Generally speaking, within the context of communication systems that employ ECCs, there is a first communication device at one end of a communication channel with encoder capability and second communication device at the other end of the communication channel with decoder capability. In many instances, one or both of these two communication devices includes encoder and decoder capability (e.g., within a bi-directional communication system). ECCs can be applied in a variety of additional applications as well, including those that employ some form of data storage (e.g., hard disk drive (HDD) applications and other memory storage devices) in which data is encoded before writing to the storage media, and then the data is decoded after being read/retrieved from the storage media.

BRIEF DESCRIPTION OF THE SEVERAL VIEWS OF THE DRAWINGS

FIG. 13 illustrates an embodiment of the iterative decoding flow for general product codes.

FIG. 14 and FIG. 15 illustrate an embodiment of the iterative modified decoding flow for general product codes.

FIG. 16A illustrates an embodiment of method for performing receiver processing of a signal received from a communication channel.

FIG. 16B and FIG. 16C illustrate embodiment of various methods for performing receiver processing of a signal received from a communication channel and reverting of bit values from previous decoding iterations.

FIG. 17A illustrates an embodiment of a method for performing product encoding involving including cyclic redundancy check (CRC) therein.

FIG. 17B illustrates an embodiment of a method for decoding processing of a product coded signal.

DETAILED DESCRIPTION OF THE INVENTION

Figure 1:
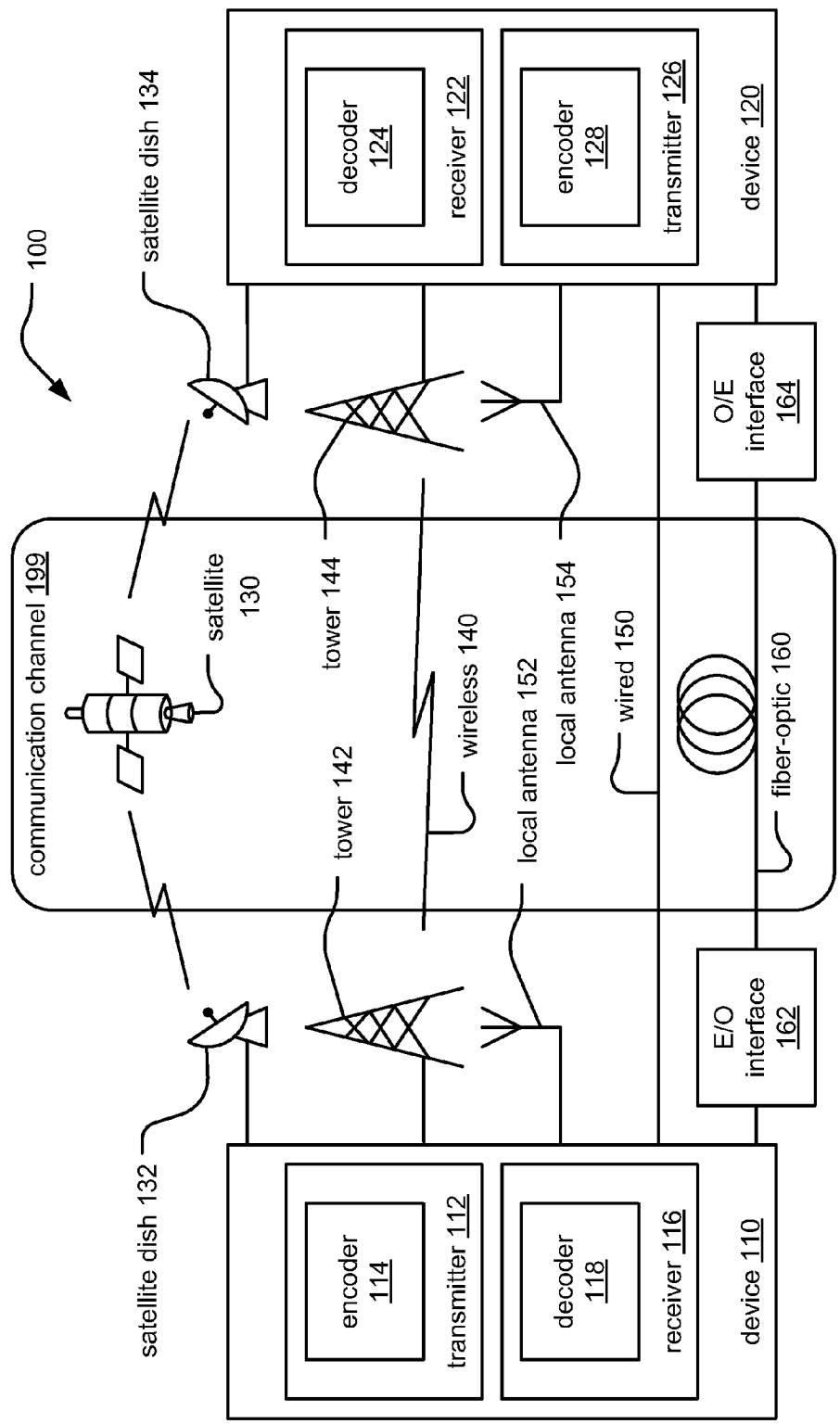
FIG. 1 and FIG. 2 illustrate various embodiments of communication systems.

The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

Figure 2:
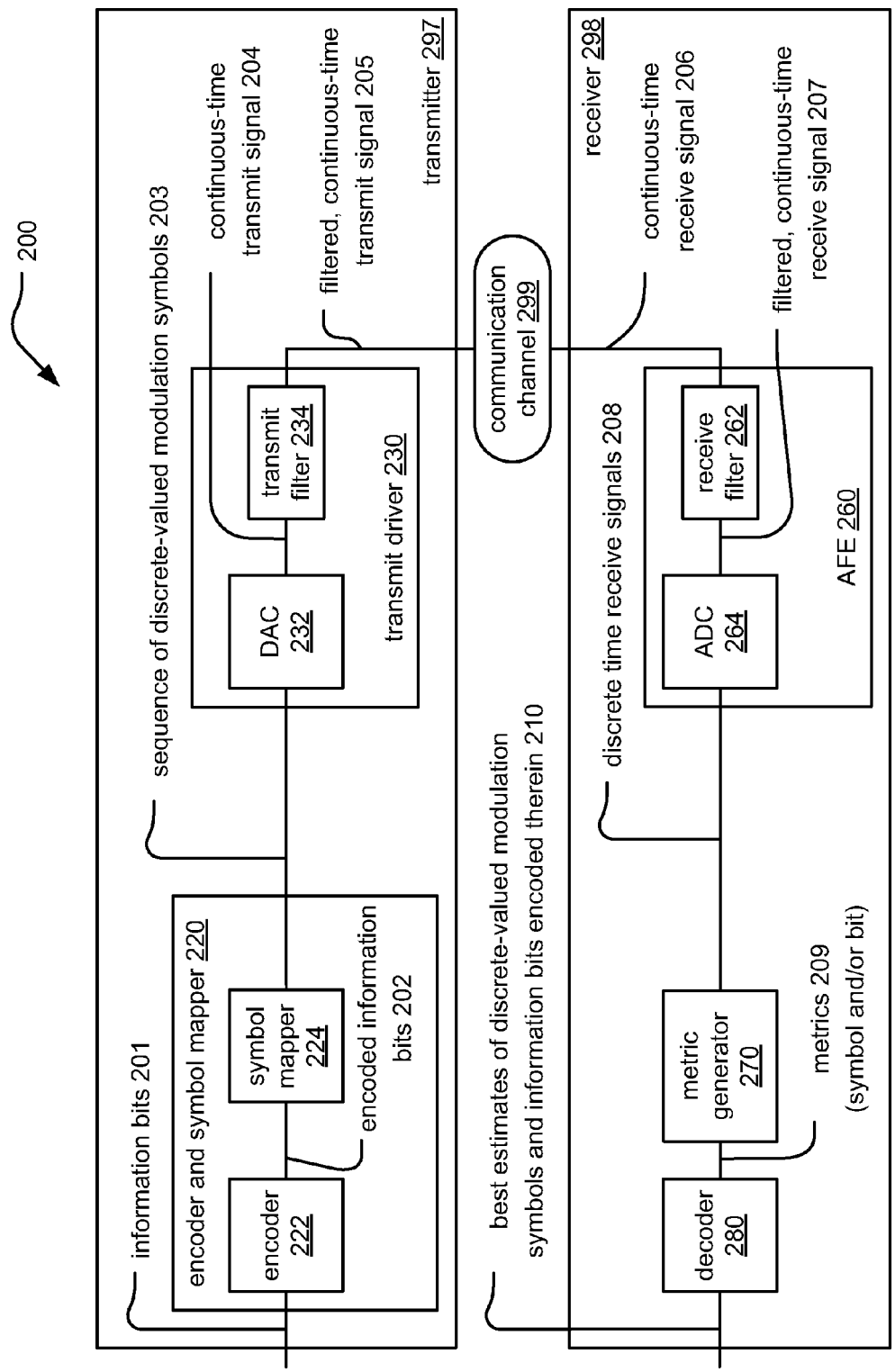

FIG. 1 and FIG. 2 illustrate various embodiments of communication systems, 100 and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

To reduce transmission errors that may undesirably be incurred within a communication system, error correction and channel coding schemes are often employed. Generally, these error correction and channel coding schemes involve the use of an encoder at the transmitter and a decoder at the receiver.

Any of the various types of coding described herein can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Referring to the communication system 200 of FIG. 2, at a transmitting end of a communication channel 299, information bits 201 are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. The transmit driver 230 may perform any necessary front end processing of a signal received from a communication channel (e.g., including any one or digital to analog conversion, gain adjustment, filtering, frequency conversion, etc.) to generate the filtered, continuous-time transmit signal 205.

At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). The AFE 260 may perform any necessary front end processing of a signal received from a communication channel (e.g., including any one or analog to digital conversion, gain adjustment, filtering, frequency conversion, etc.) to generate a digital signal provided to a metric generator 270 that generates a plurality of metrics corresponding to a particular bit or symbol extracted from the received signal. The metric generator 270 calculates metrics 209 (e.g., on either a symbol and/or bit basis) that are employed by a decoder 280 to make best estimates of the discrete-valued modulation symbols and information bits encoded therein 210.

The decoders of either of the previous embodiments may be implemented to include various aspects and/or embodiment of the invention therein. In addition, several of the following figures describe other and particular embodiments (some in more detail) that may be used to support the devices, systems, functionality and/or methods that may be implemented in accordance with certain aspects and/or embodiments of the invention.

It is noted that various types of error correction codes (ECCs) may be employed herein. For example, any one or more of any type or variant of Reed-Solomon (RS) code, turbo code, turbo trellis code modulation (TTCM) code, LDPC (Low Density Parity Check) code, BCH (Bose and Ray-Chaudhuri, and Hocquenghem) code, etc. Moreover, as will be seen in various embodiments herein, more than one ECC and/or more than one type of ECC may be employed when generating a single encoded signal in accordance with the principles presented herein. For example, certain of the embodiments presented herein operate as product codes, in which an ECC is employed more than once or more than one type of ECC is employed (e.g., a first ECC during a first time and a second ECC at a second time) to generate an encoded signal.

Moreover, it is noted that both systematic encoding and non-systematic encoding may be performed in accordance with the various principles presented herein. Systematic encoding preserves the information bits being encoded and generates corresponding redundancy/parity bits (i.e., redundancy and parity may be used interchangeably herein); for example, the information bits being encoded are explicitly shown/represented in the output of non-systematic encoding. Non-systematic encoding does not necessarily preserve the information bits being encoded and generates coded bits that inherently include redundancy parity information therein; for example, the information bits being encoded need not be explicitly shown/represented in the output of non-systematic encoding. While many of the embodiments shown herein refer to systematic encoding, it is note that non-systematic encoding may alternatively, be performed in any embodiment without departing from the scope and spirit of the invention.

Certain embodiments of communication device and methods operating in accordance with the principles presented herein are designed to maximize coding gain as high as possible while maintaining a reasonable or acceptable hardware complexity and power consumption. Moreover, certain embodiments (e.g., to be compliant in accordance with a certain standard or communication protocol), certain constraints such as bit error rate (BER) or block error rate (BLER), redundancy rate or code rate, bit rates, throughput, etc.

For example, one embodiment that operates in accordance with a 100 Gbps (Giga-bits per second) bit rate targets a BER in the range of $1\times10^{-14}$ or $1\times10^{-15}$, and has a fixed redundancy rate of 16/239 or 6.69%.

Figure 3:
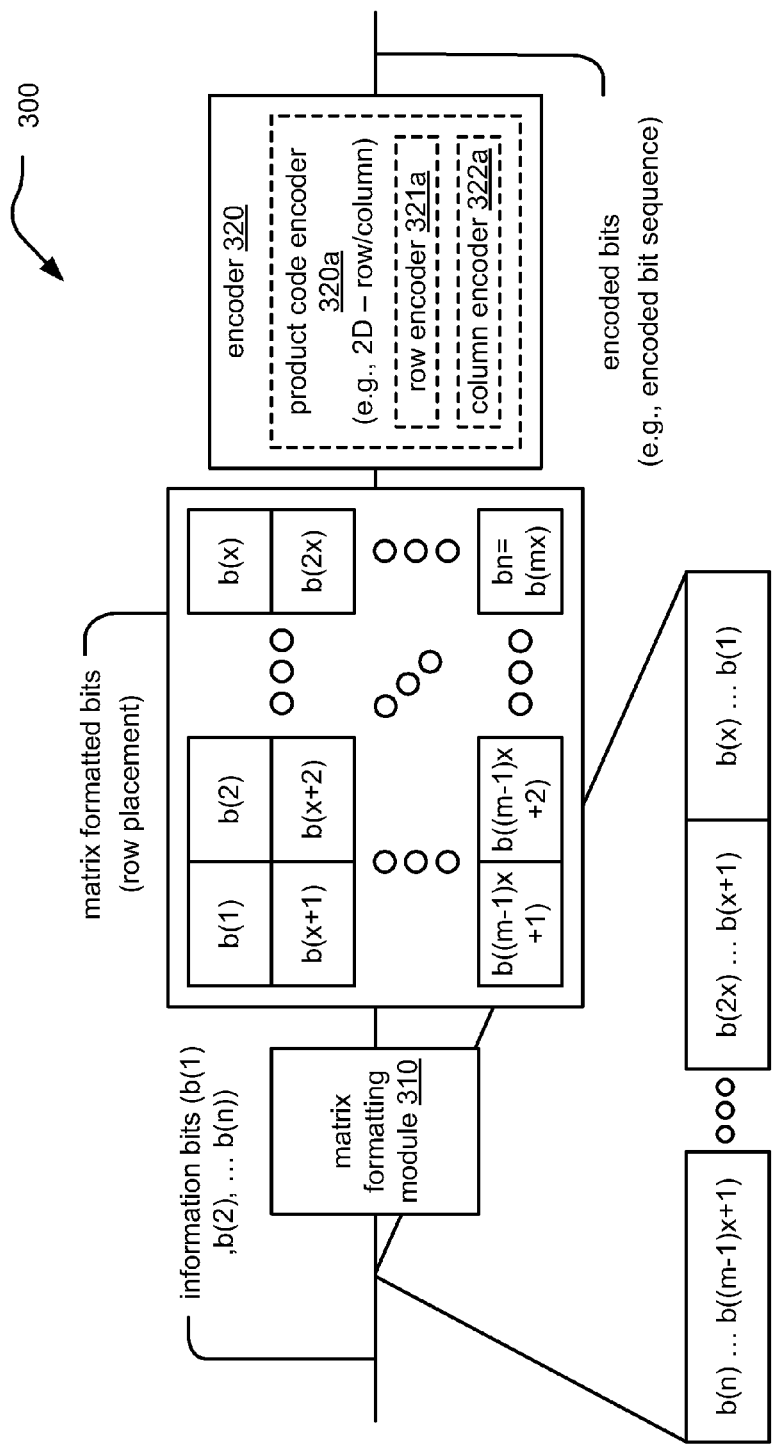
FIG. 3 illustrates an embodiment of an apparatus that is operative to perform matrix formatting and product code encoding.

FIG. 3 illustrates an embodiment of an apparatus 300 that is operative to perform matrix formatting and product code encoding. In this embodiment, an information bit sequence (e.g., including bits 1 through n as depicted by b(1), b(2), and so on up to b(n)) is provided to a matrix formatting module 310. The matrix formatting module 310 operates by selecting/arranging the information bit sequence into a desired format/pattern. For example, the information bit sequence may be firstly arranged into information bit groups (e.g., first information bit group including bits b(1) through b(x), second information bit group including bits b(x+1) through b(2x), and so on until an m-th information bit group including bits b((m−1)x+1) through b(n)[end of original information bit sequence]), and each information bit group then is arranged appropriately into rows (e.g., row placement) thereby generating matrix formatted bits.

An encoder 320 selectively encodes the matrix formatted bits thereby generating encoded bits (e.g., an encoded bit sequence). For example, parity bits corresponding to the matrix formatted bits are generated in accordance with encoding.

In some embodiments, the encoder 320 is a product code encoder 320a. A product code encoder may be viewed as being a two dimensional encoder that operates in a first dimension, and then operates in a second dimension. Each of these two dimensions may employ a common ECC, or they may employ different ECCs. In even another embodiment, different respective ECCs may be employed for the respective rows and/or columns of the matrix formatted bits. In one embodiment, the first dimension is performed using a row encoder 321a, and the second dimension is performed using a column encoder 322a.

It is noted that a common ECC may be employed when encoding the separate rows of bits within the matrix formatted bits; alternatively, different ECCs may be employed when encoding the various rows of bits within the matrix formatted bits. Similarly, a common ECC may be employed when encoding the separate columns of bits within the matrix formatted bits; alternatively, different ECCs may be employed when encoding the various columns of bits within the matrix formatted bits.

Figure 4:
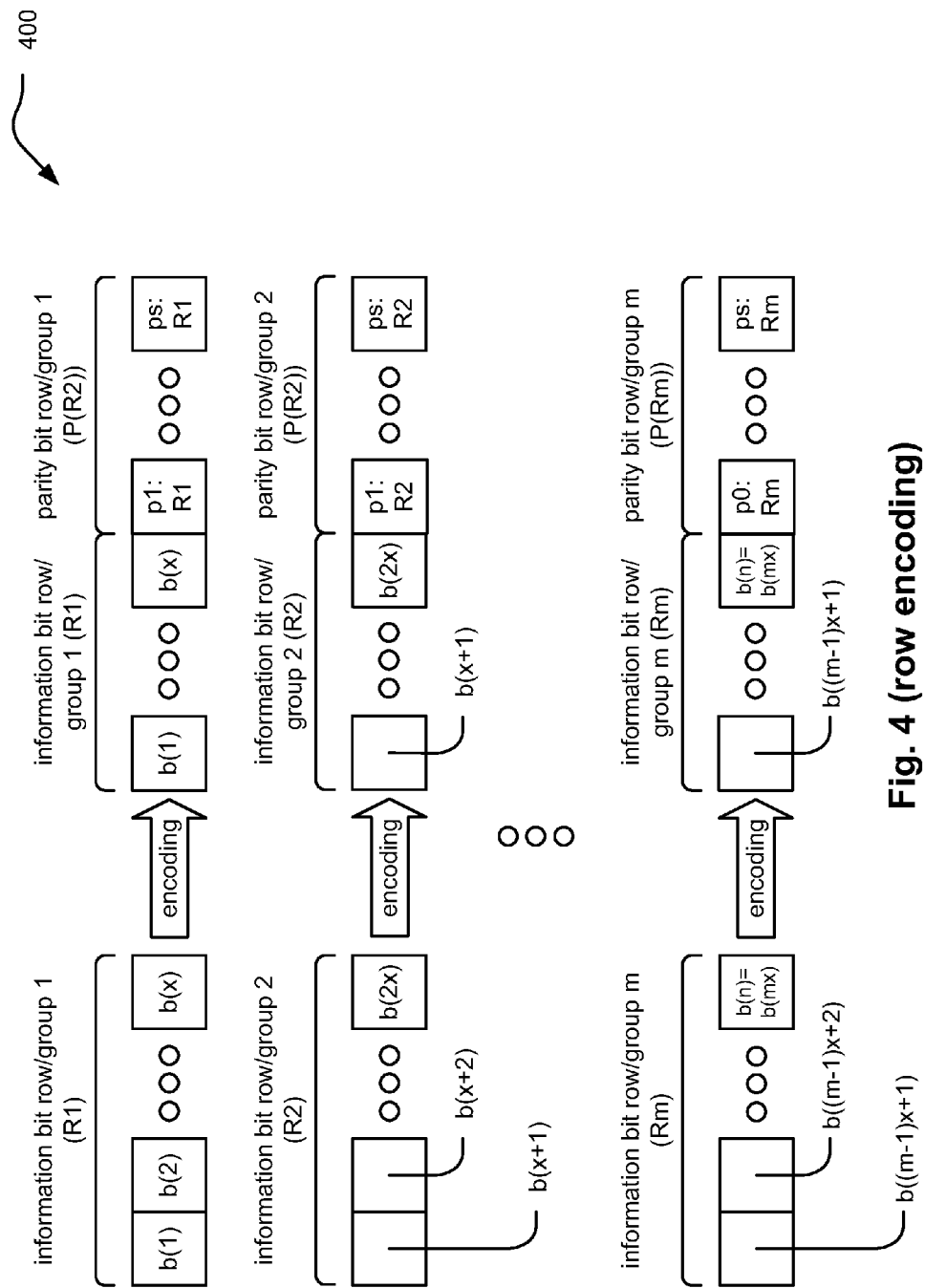
FIG. 4 and FIG. 5 illustrate embodiments of row and column encoding of matrix formatted bits, respectively.
Figure 5:
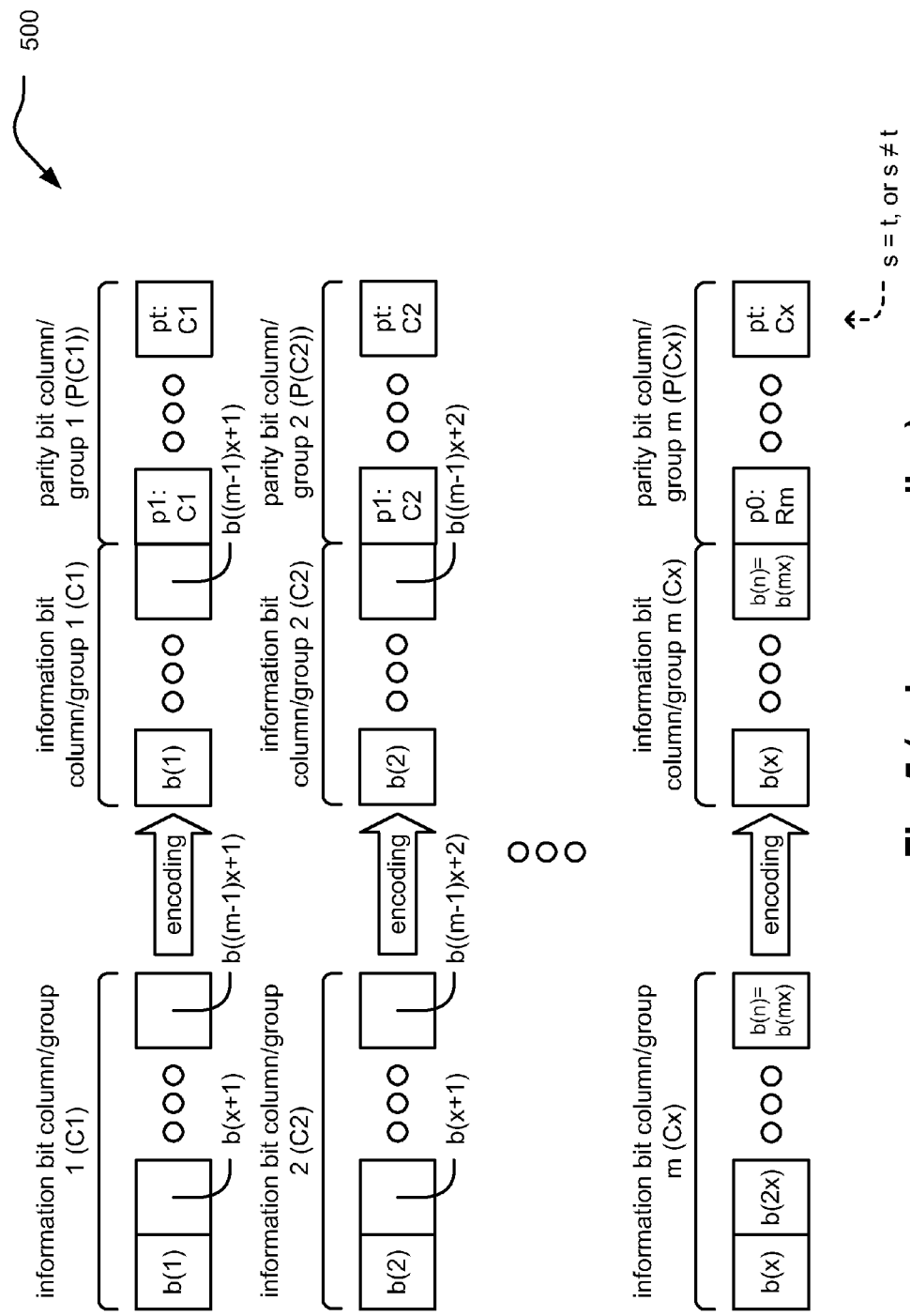

FIG. 4 and FIG. 5 illustrate embodiments, 400 and 500, respectively, of row and column encoding of matrix formatted bits, respectively. These embodiments 400 and 500 depict systematic encoding, but again, non-systematic encoding can be employed in alternative embodiments without departing from the scope and spirit of the invention.

Referring to embodiment 400 of FIG. 4, an information bit row/group 1 (R1) shown as including bits b(1) through b(x) undergo encoding in accordance with an ECC to generate parity bit row/group 1 (P(R1)). For each of the other rows of the matrix formatted bits (e.g., shown in FIG. 3), the corresponding information bit row/group undergoes encoding in accordance with an ECC to generate a corresponding parity bit row/group.

Referring to embodiment 500 of FIG. 5, an information bit column/group 1 (C1) shown as including bits b(1) through b((m−1)x+1) undergo encoding in accordance with an ECC to generate parity bit column/group 1 (P(C1)). For each of the other columns of the matrix formatted bits (e.g., shown in FIG. 3), the corresponding information bit column/group undergoes encoding in accordance with an ECC to generate a corresponding parity bit column/group.

Figure 6:
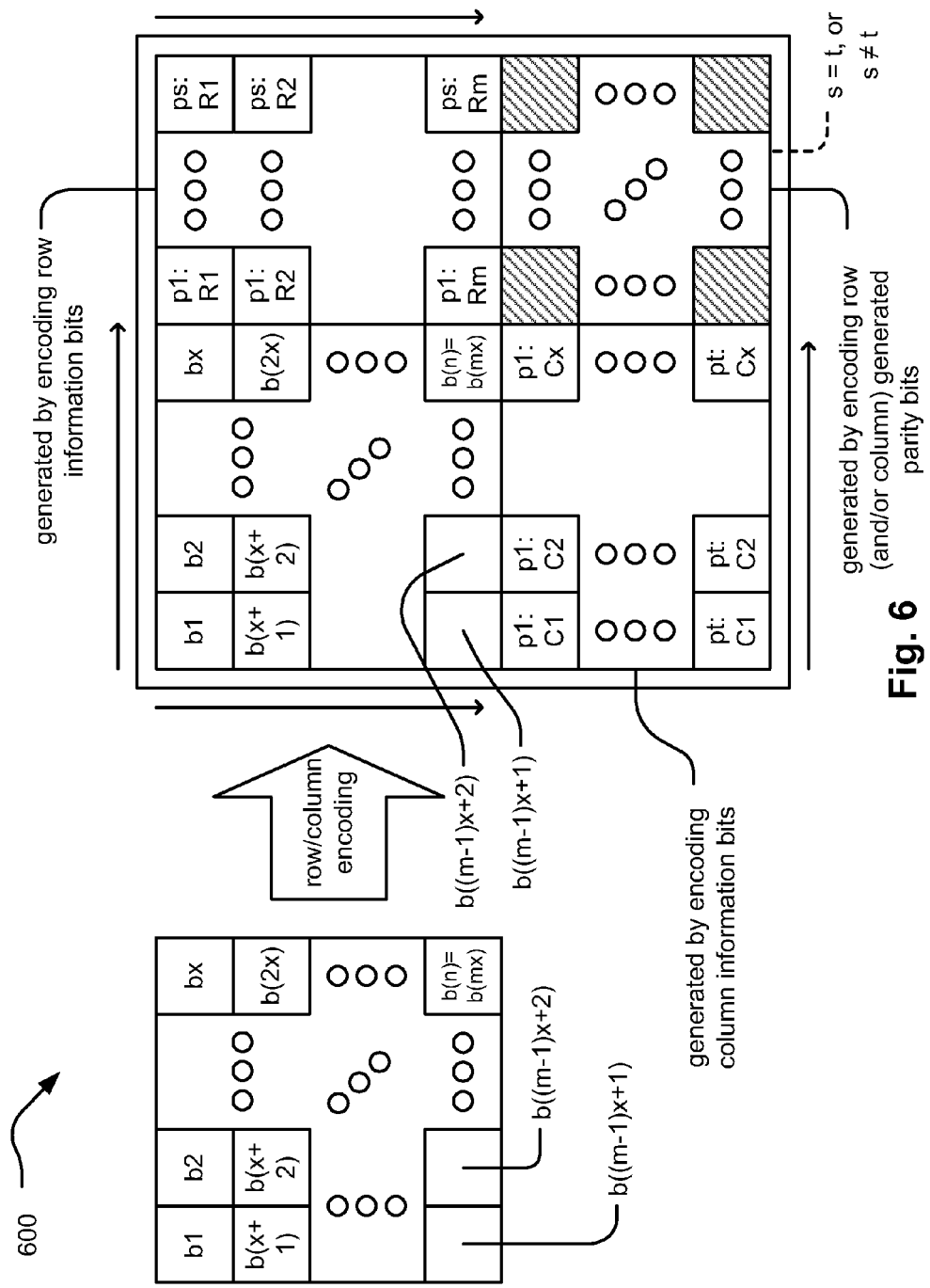
FIG. 6 illustrates an alternative embodiment of row and column encoding of matrix formatted bits.

FIG. 6 illustrates an alternative embodiment 600 of row and column encoding of matrix formatted bits. The embodiment 600 shows the relationship between matrix formatted bits and the parity bits generated in accordance with row encoding and column encoding.

As can be seen when comparing the matrix formatted bits on the left hand side with the resulting encoded matrix on the right hand side, the matrix formatted bits is included in the resulting encoded matrix along with parity bits generated in accordance with row encoding (i.e., located to the right hand side of the matrix formatted bits, shown as including s parity bits each) as well as parity bits generated in accordance with column encoding (i.e., located below the matrix formatted bits, shown as including t parity bits each). It is noted that t may equal s in some embodiments, or it may be different be different values in other embodiments.

It is also noted that column encoding may subsequently be performed on the parity bits generated in accordance with row encoding to generate additional parity bits included below those parity bits (i.e., located in lower right hand corner of the resulting encoded matrix). Alternatively, it is also noted that row encoding may subsequently be performed on the parity bits generated in accordance with column encoding to generate parity bits included to the right hand side of those parity bits (i.e., located in lower right hand corner of the resulting encoded matrix).

In an even alternative embodiment, a combination of column encoding performed on the parity bits generated in accordance with row encoding and column encoding (i.e., some of the parity bits located in lower right hand corner of the resulting encoded matrix may be generated by encoding the parity bits located above and some of the parity bits located in lower right hand corner of the resulting encoded matrix may be generated by encoding the parity bits located to the left). In even another embodiment, it is also possible to have all of the generated parity bits from row encoding and column encoding appended after the source data sequence.

Figure 7:
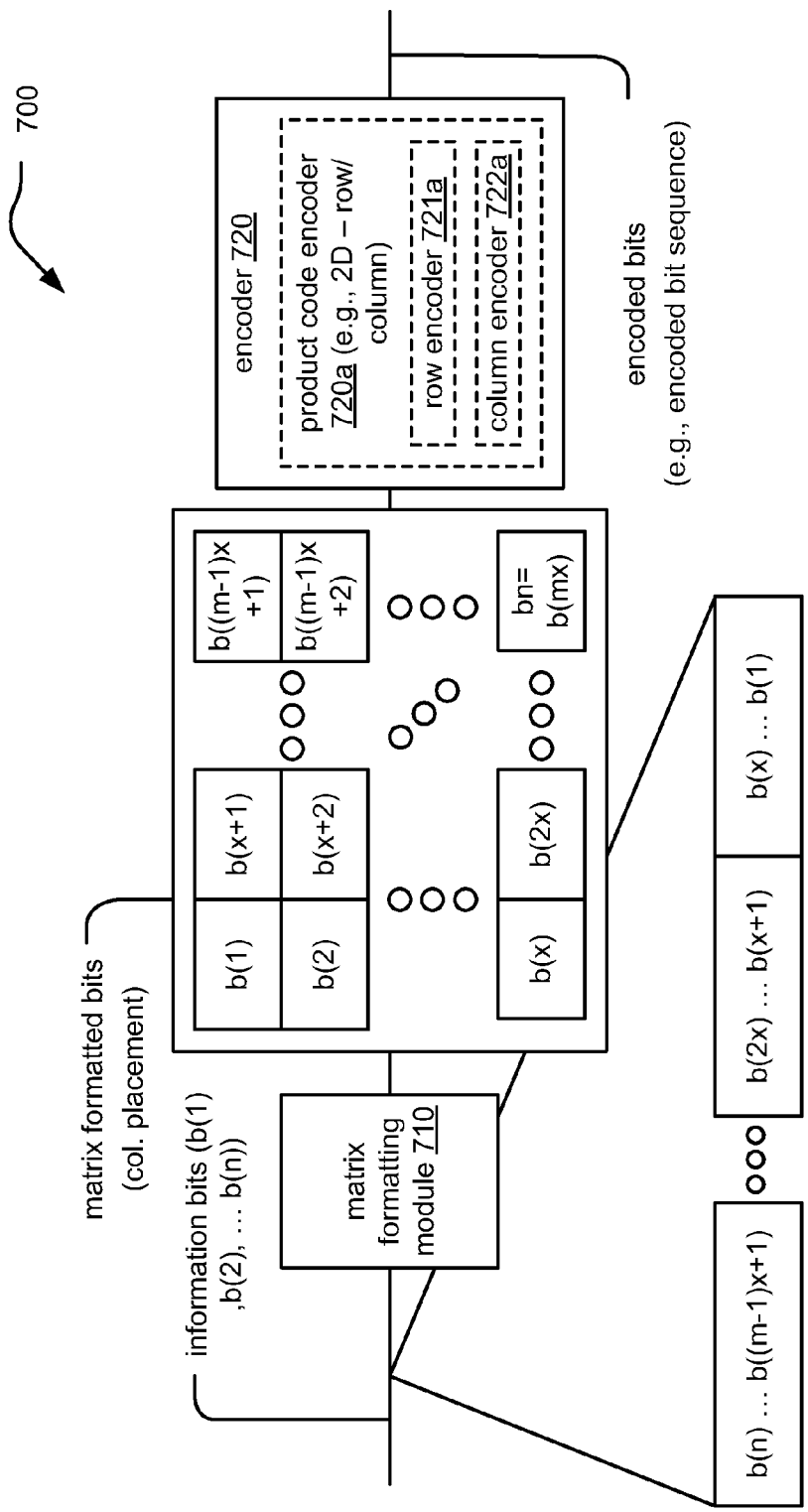
FIG. 7 illustrates an alternative embodiment of an apparatus that is operative to perform matrix formatting and product code encoding.

FIG. 7 illustrates an alternative embodiment of an apparatus 700 that is operative to perform matrix formatting and product code encoding. This embodiment is somewhat analogous to the apparatus 300 of FIG. 3 with at least one difference being that the resulting matrix formatted bits are arranged in accordance with column placement.

In this embodiment, an information bit sequence (e.g., including bits 1 through n as depicted by b(1), b(2), and so on up to b(n)) is provided to a matrix formatting module 710. The matrix formatting module 710 operates by selecting/arranging the information bit sequence into a desired format/pattern. For example, the information bit sequence may be firstly arranged into information bit groups (e.g., first information bit group including bits b(1) through b(x), second information bit group including bits b(x+1) through b(2x), and so on until an nth information bit group including bits b((m−1)x+1) through b(n)[end of original information bit sequence]), and each information bit group then is arranged appropriately into columns (e.g., column placement) thereby generating matrix formatted bits.

An encoder 720 selectively encodes the matrix formatted bits thereby generating encoded bits (e.g., an encoded bit sequence). For example, parity bits corresponding to the matrix formatted bits are generated in accordance with encoding.

In some embodiments, the encoder 720 is a product code encoder 720a. A product code encoder may be viewed as being a two dimensional encoder that operates in a first dimension, and then operates in a second dimension. Each of these two dimensions may employ a common ECC, or they may employ different ECCs. In one embodiment, the first dimension is performed using a row encoder 721*a*, and the second dimension is performed using a column encoder 722*a*.

Again, it is noted that a common ECC may be employed when encoding the separate rows of bits within the matrix formatted bits; alternatively, different ECCs may be employed when encoding the various rows of bits within the matrix formatted bits. Similarly, a common ECC may be employed when encoding the separate columns of bits within the matrix formatted bits; alternatively, different ECCs may be employed when encoding the various columns of bits within the matrix formatted bits.

Figure 8:
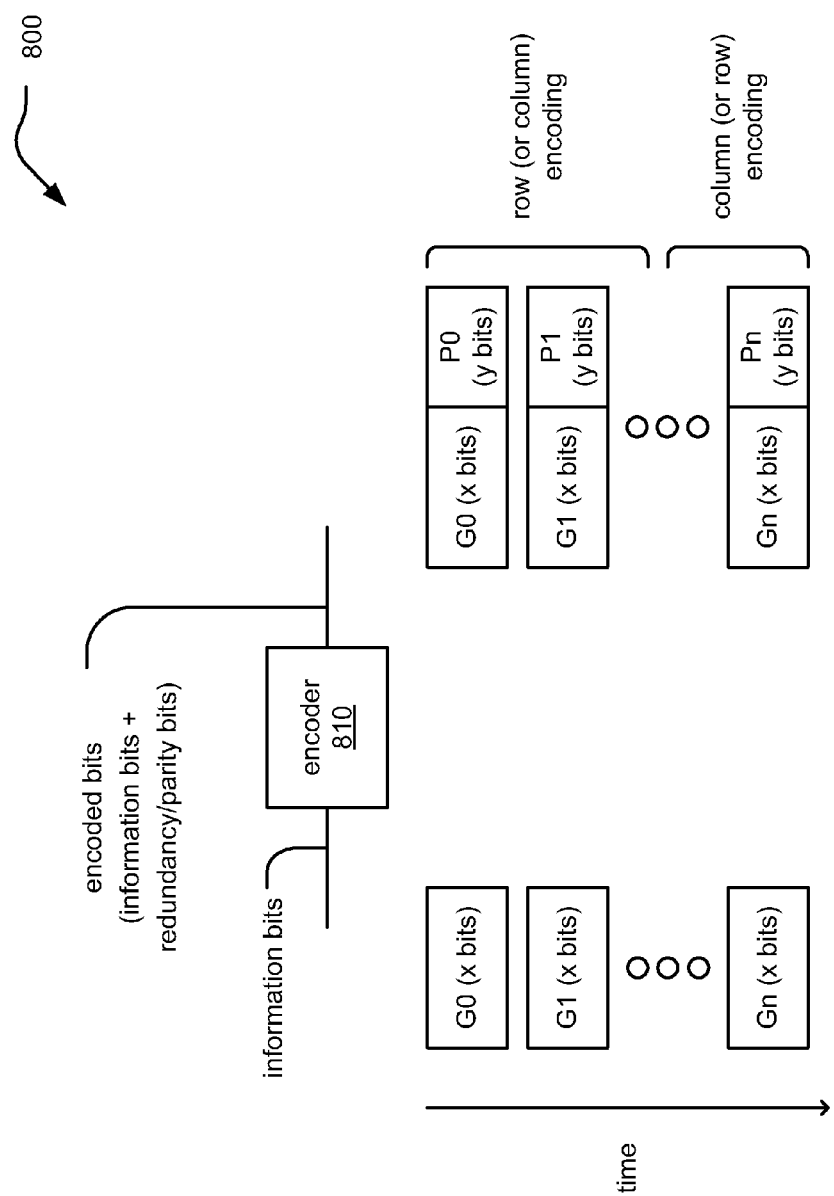
FIG. 8 illustrates an embodiment of systematic bit encoding of various bit groups using a common code for all bit groups.

FIG. 8 illustrates an embodiment 800 of systematic bit encoding of various bit groups using a common code for all bit groups. Information bits are provided to an encoder 810 and encoded bits are output there from (i.e., information bits+redundancy/parity bits in a systematic encoding embodiment).

The information bits are firstly arranged into information bit groups (e.g., first information bit group (G0) including x bits, second information bit group (G1) including x bits, and so on up to information bit group (Gn) including x bits).

Each of the information bit groups undergoes encoding using a common ECC to generate corresponding parity bit groups (each including y bits). Certain of the generated coded bits (e.g., information bits+parity bits) are arranged and undergo row encoding. Other of the generated coded bits (e.g., information bits+parity bits) are arranged and undergo column encoding.

Figure 9:
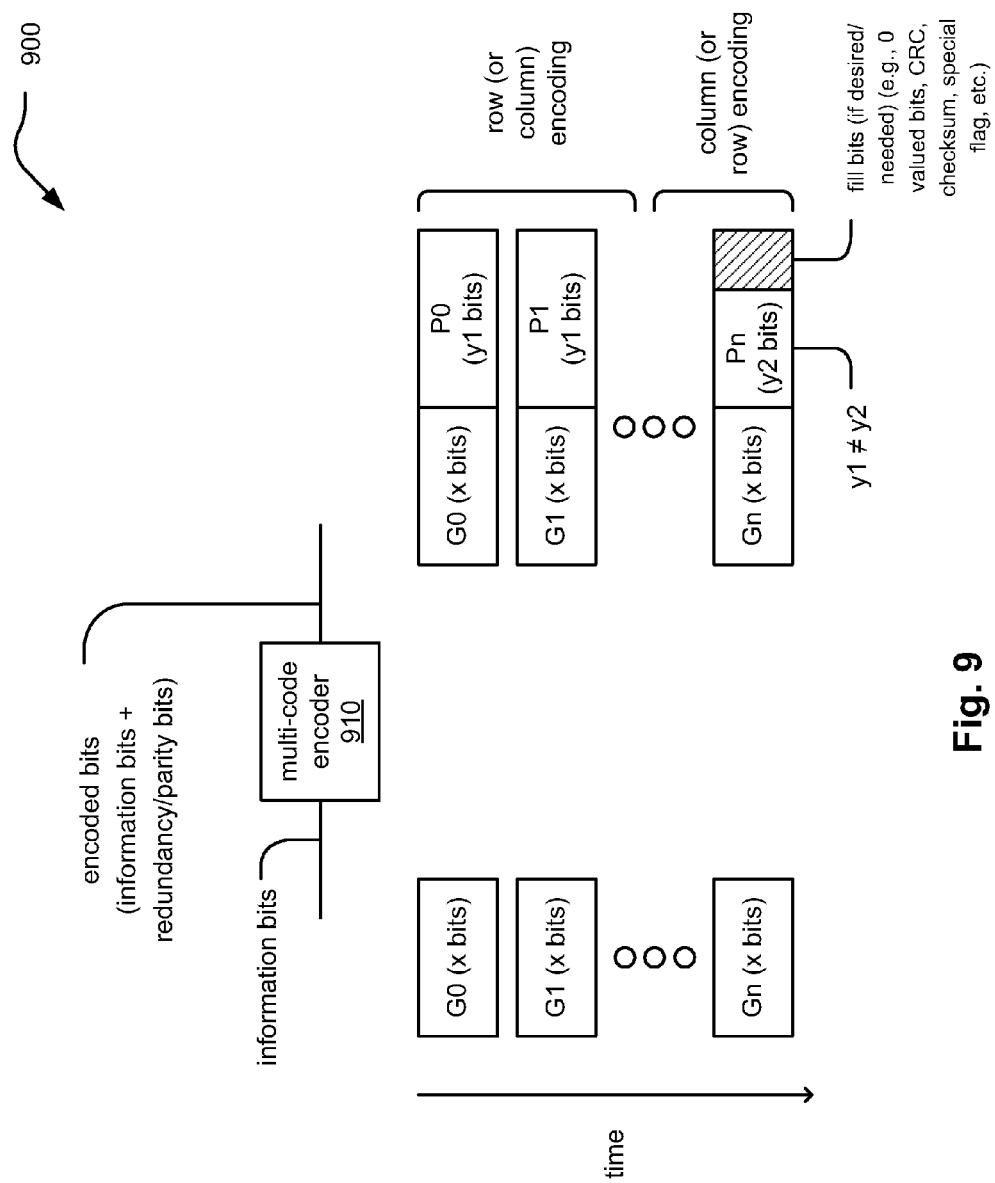
FIG. 9 illustrates an alternative embodiment of systematic bit encoding of various bit groups using two or more codes for the various bit groups.

FIG. 9 illustrates an alternative embodiment 900 of systematic bit encoding of various bit groups using two or more codes for the various bit groups.

Information bits are provided to a multi-code encoder 910 and encoded bits are output there from (i.e., information bits+redundancy/parity bits in a systematic encoding embodiment). The multi-code encoder 910 includes and is operative to employ a different ECC at different times to encode different information bits.

The information bits are firstly arranged into information bit groups (e.g., first information bit group (G0) including x bits, second information bit group (G1) including x bits, and so on up to information bit group (Gn) including x bits).

Each of the information bit groups undergoes encoding using a respective ECC to generate corresponding parity bit groups. For example, the first coded bits includes information bit group (G0) (x bits) and parity bit group P0 (y1 bits). The second coded bits includes information bit group (G1) (x bits) and parity bit group P1 (y1 bits). The first coded bits and the second coded bits are generated using a first ECC (e.g., each of the information bit groups (G0) and (G1) including a same number of bits, and each of the parity bit groups (P0) and (P1) also including a respective same number of bits). However, in this embodiment using a multi-code encoder 910, the coded bits including information bit group (Gn) (x bits) undergo encoding thereby generating parity bit group Pn (yn bits); these information bit group (Gn) (x bits) bits are generated using a second ECC (e.g., that has a different amount of redundancy that the first ECC used to generate the parity bit groups (P0) and (P1)).

If desired, to ensure that a same number of bits are included within each information bit group and each parity bit group (or for any other purpose, e.g., to ensure the overall coded bits meet some constraint or requirement), fill bits may be employed. The placement of these fill bits may be anywhere within that respective sequence (e.g., at the end, at the beginning, interspersed therein in accordance with some pattern). The fill bits may be all zero-valued bits, they may be cyclic redundancy check (CRC) bits, checksum/parity bits, special flag bits to indicate an occurrence of some issue, etc.). In particular, these fill bits may be inserted before encoding or after encoding for one or more of the code groups.

Figure 10:
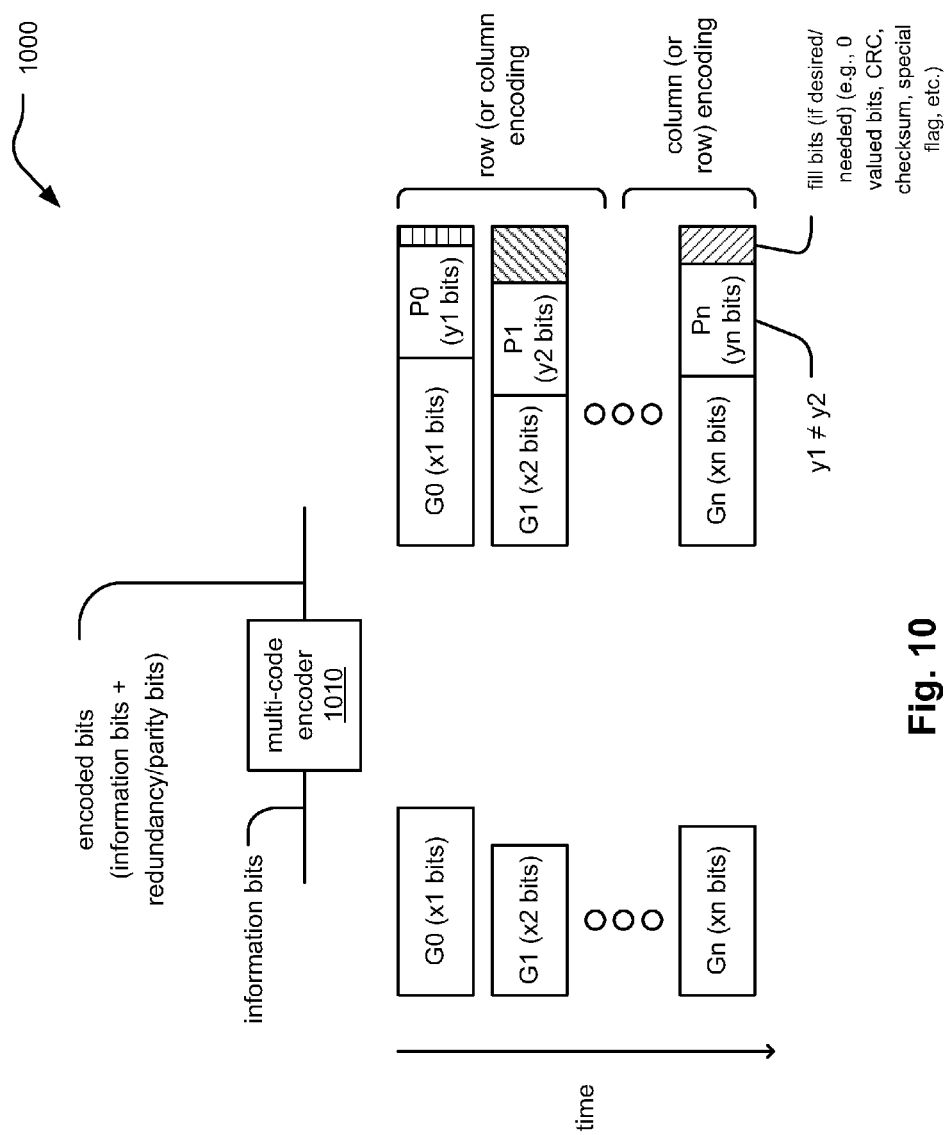
FIG. 10 illustrates an alternative embodiment of systematic bit encoding of various bit groups using two or more codes for the various bit groups.

FIG. 10 illustrates an alternative embodiment 1000 of systematic bit encoding of various bit groups using two or more codes for the various bit groups.

Information bits are provided to a multi-code encoder 1010 and encoded bits are output there from (i.e., information bits+redundancy/parity bits in a systematic encoding embodiment). The multi-code encoder 1010 includes and is operative to employ a different ECC at different times to encode different information bits.

The information bits are firstly arranged into information bit groups (e.g., first information bit group (G0) including x1 bits, second information bit group (G1) including x2 bits, and so on up to information bit group (Gn) including xn bits).

The first coded bits includes information bit group (G0) (x1 bits) and parity bit group P0 (y1 bits) as generated by a first ECC. The second coded bits includes information bit group (G1) (x2 bits) and parity bit group P1 (y2 bits) as generated by a second ECC. The nth coded bits includes information bit group (Gn) (xn bits) and parity bit group Pn (yn bits) as generated by an nth ECC.

If desired, to ensure that a same number of bits is included within each information bit group and each parity bit group (or for any other purpose, e.g., to ensure the overall coded bits meet some constraint or requirement), fill bits may be employed. The placement of these fill bits may be anywhere within that respective sequence (e.g., at the end, at the beginning, interspersed therein in accordance with some pattern). The fill bits may be all zero-valued bits, they may be cyclic redundancy check (CRC) bits, checksum/parity bits, special flag bits to indicate an occurrence of some issue, etc. The fill bits may be different in each of the respective coded bit groups, and certain of the coded bit groups may include no fill bits whatsoever.

Herein, a series of product codes (i.e., a product code is a novel type of forward error correction (FEC) code) may be applied for consideration, among other protocols and/or standards, of the ITU-T 100 Gb/s standards. These product codes are alternatively referred to as SP-BCH code, where SP can be viewed as being interpreted as "Super Product" or "Simple Product".

All product codes presented here consist of row component codes and column component codes. Either component code is a BCH code (e.g., a BCH code is a code as invented independently by (1) Hocquenghem and by (2) Bose and Ray-Chaudhuri—which may generally be referred to as a BCH (Bose, Ray-Chaudhuri, Hocquenghem) code). To reduce false detection probability, one or more extra control bits may be added after source data before (and/or after) encoding. For instance, BCH (1022, 991)×BCH(1022, 990) is a kind of product code, where for row codes, 1 extra bit may be added (i.e., this extra bit can be a parity bit from the source data or a bit from a cyclic redundancy check (CRC) checksum or a kind of control bit to be decided based on various coding conditions). For easier hardware implementation in certain embodiments, interleaving should only be considered inside each row or inside each column, but not both for certain embodiments of product codes.

Figure 11:
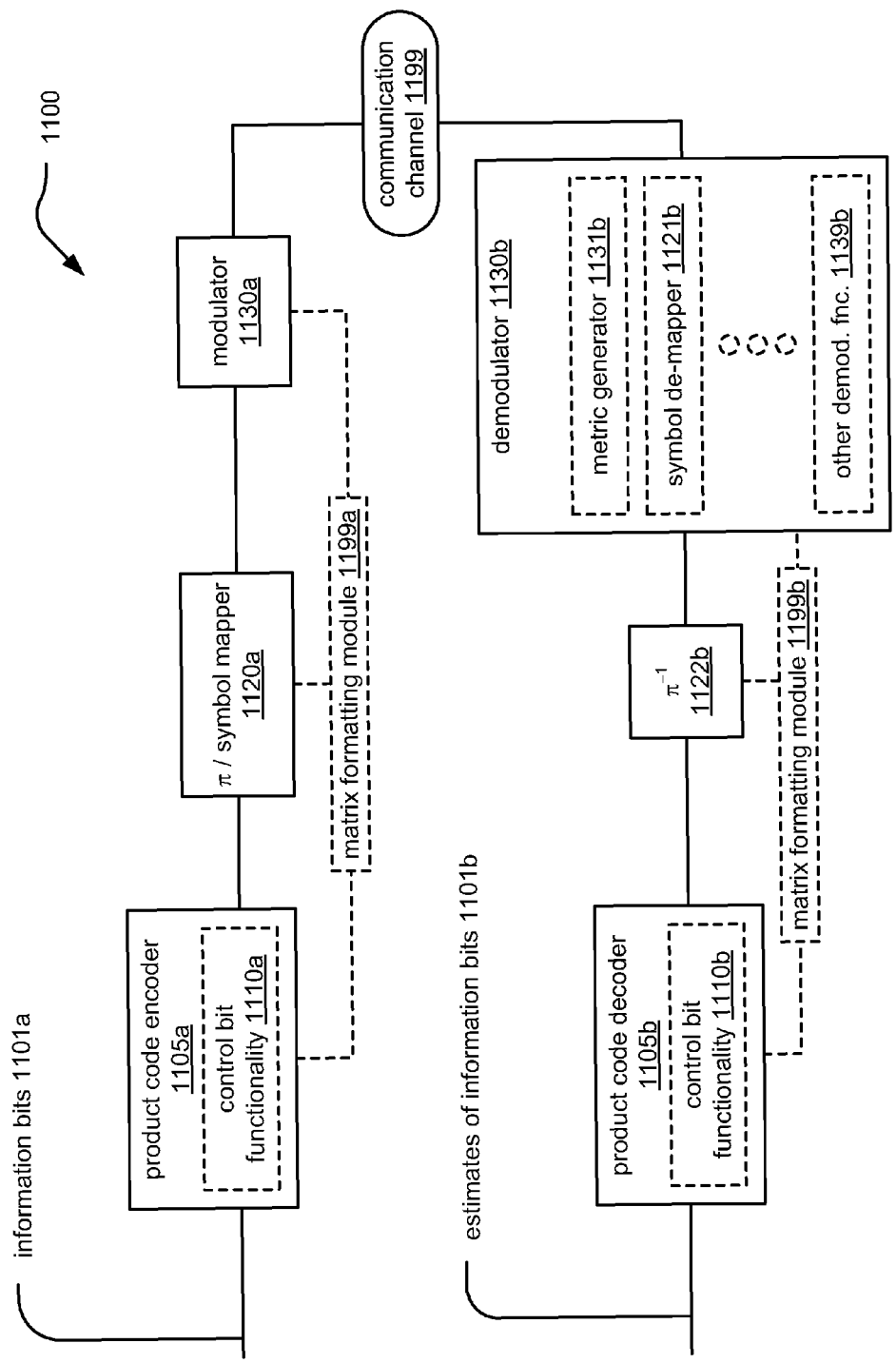
FIG. 11 illustrates an alternative embodiment of a communication system.

FIG. 11 illustrates an alternative embodiment of a communication system 1100. Information bits 1101*a* are provided to a product code encoder 1105*a*. In some embodiments, the coding employed by the product code encoder 1105a may be a SP-BCH code. In accordance with performing product code encoding, the product code encoder 1105a may also include control bit functionality 1110a that is selectively operative to add one or more extra or control bits in accordance with the product code encoding within the product code encoder 1105a. These one or more extra or control bits may be any desired form as desired in any particular embodiment (e.g., CRC, control bit, parity bit of source data, etc.). Of course, in some embodiments, no extra or control bits are added by the control bit functionality 1110a within the product code encoder 1105a. The operations as performed by the control bit functionality 1110a within the product code encoder 1105a may be in accordance with any of the variants, embodiments, or equivalences as described herein (e.g., such as adding 2 extra bits to both row codes and column codes, adding 1 extra bit to all (or at least one of) row codes and add 2 extra bits to all (or at least one of) column codes, adding 2 extra bits to all (or at least one of) row codes and add 1 extra bit to all (or at least one of) column codes, and/or adding 1 extra bit to both row codes and column codes, and/or in accordance with any other desired manner, etc.).

The resulting coded bits (e.g., product coded bits which may include one or more extra or control bits) are provided from the product code encoder 1105a to an interleaver (π)/symbol mapper 1120a implemented to perform any desired combination of interleaving and symbol mapping (which may symbol map different symbols to different modulations (i.e., constellations with respective mappings of the constellation points therein).

A modulator 1130a (e.g., which may be viewed as being an embodiment of a transmit driver) performs any necessary modification (e.g., frequency conversion, gain adjustment, filtering, etc.) to the discrete sequence of symbols output from the interleaver (it)/symbol mapper 1120a to generate a continuous time signal that comports with the characteristics of communication channel 1199 (e.g., including filtering, digital to analog conversion, frequency conversion, gain adjustment, etc.).

A demodulator 1130b receives the signal from the communication channel 1199 (e.g., the signal may have incurred certain effects including noise, etc.) and perform demodulation thereon. This may involve the calculation of certain metrics (e.g., by a metric generator 1131b) and symbol de-mapping (e.g., by a symbol de-mapper 1121b) for use in subsequent decoding. This may also involve any other demodulation function (e.g., as shown by reference numeral 1139b) including filtering, analog to digital conversion, frequency conversion, gain adjustment, etc.

After undergoing the demodulation operations, the bit sequence generated there from undergoes de-interleaving in de-interleaver (π$^{-1}$) 1122b. Thereafter, a product code decoder 1105b, that corresponds to the type of code employed within the product code encoder 1105a, is operative to process the signal output from the de-interleaver (π$^{-1}$) 1122b. Estimates of the original information bits 1101b are output from the product code decoder 1105b. The product code decoder 1105b may include control bit functionality 1110b to operate and process any one or more extra or control bits that may have been included in accordance with the product code decoder 1105a within the product code encoder 1105a. These added control or extra bits will be used to reduce false error correction probability.

With respect to the embodiment of FIG. 11, the Applicant also respectfully points out that a matrix formatting module 1199a may be implemented within a transmitter communication device (that may include all of the components shown before the communication channel 1199) at a first end of the communication channel 1199, and a matrix formatting module 1199b may be implemented within a receiver communication device (that may include all of the components shown after the communication channel 1199) at a second end of the communication channel 1199. The respective matrix formatting modules 1199a and 1199b are operative to perform formatting of information bits, coded bits, interleaved bits, control bits, etc. based on matrix formatting in accordance with the principles described herein as well as performs coordination between one or more of the various modules within the respective transmitter and receiver communication devices, respectively. In certain embodiments, the matrix formatting module 1199a may be communicatively coupled to one or more of the components shown within a transmitter device, and the matrix formatting module 1199b may be communicatively coupled to one or more of the components shown within a receiver device. The respective matrix formatting modules 1199a and 1199b may also operate in accordance with coordination among one another without departing from the scope and spirit of the invention. In this embodiment, as well as other embodiments described herein, various embodiments may include more or fewer modules and/or functional blocks without departing from the scope and spirit of the invention.

Figure 12:
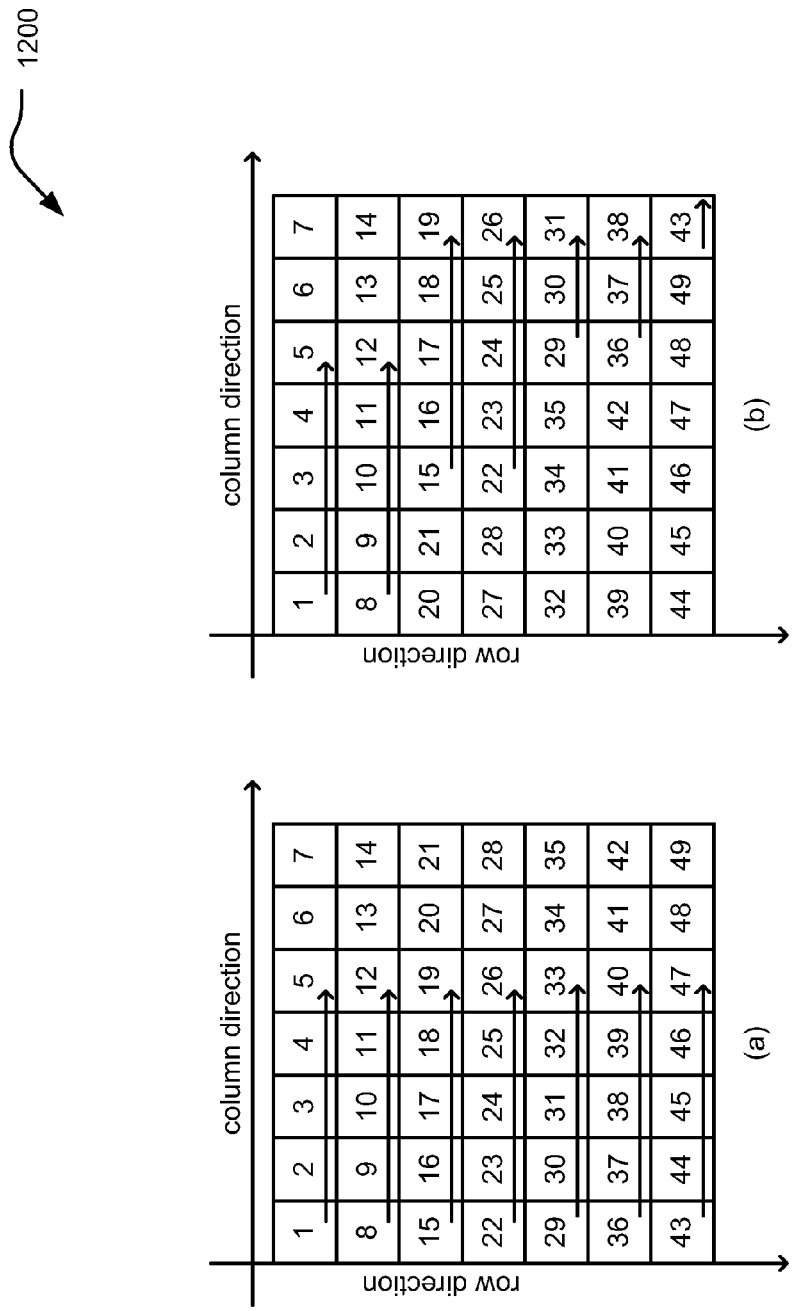
FIG. 12 illustrates an embodiment of product code configurations.

FIG. 12 illustrates an embodiment 1200 of product code configurations. FIG. 12 shows two simple examples. In either case of this embodiment 1200, there are 7 rows and 7 columns. In practice, the number of rows doesn't have to be the same as that of the number of columns. In the left hand side of FIG. 12 (*a*), there's no interleaving in either row or column directions. In the right hand side of FIG. 12 (*b*), each row is cyclically shifted. For instance, for 3$^{rd}$ row, the element 15 will be the first bit to the input of the row encoder. Accordingly, element 16 will be the 2$^{nd}$ bit to the encoder of that row code. To reduce encoding latency, only intra-row permutation may be employed in certain embodiments. For a relatively straightforward hardware implementation, cyclically shifting of the row elements as an optional interleaving scheme may be performed, e.g., shift 1 bit every row, or shift 2 bits every 2 rows as shown in the right hand side of FIG. 12 (*b*).

If BCH codes are employed with a small t (error correct capability), e.g., t<=4, additional redundancy (e.g., in form of CRC) may be included by adding 1 or 2, or even up to 3 extra bits after source data before (and/or after) encoding in order to reduce false error correction possibility. In practice, adding 3 extra bits is not suggested in a preferred embodiment. So there may be 4 different combinations:

Case-I: add 2 extra bits to both row codes and column codes,

Case-II: add 1 extra bit to all (or at least one of) row codes and add 2 extra bits to all (or at least one of) column codes, Case-III: add 2 extra bits to all (or at least one of) row codes and add 1 extra bit to all (or at least one of) column codes, Case-IV: add 1 extra bit to both row codes and column codes.

Though various possible schemes and embodiments exist, for a relatively simple hardware implementation, the following scheme is preferred in one embodiment:

1. To add 1 extra bit, use even or odd parity bit of source data of the code group, 2. To add 2 extra bits, use 2-bit checksum of the source data of the code group going through a CRC check circuit with polynomial of $x^2+x+1$.

Other possibilities include, but not limited:

1) To add 1 parity bit, first set this 1 bit as 1 to encode it, and compute even or odd parity for the entire encoded group, and then set this extra bit as 0, encode it and compute same parity of the encoded group. The extra bit can be decided to be 1 or 0 based on the specific BCH codes being used and the above 2 possible encoding results. Moreover, either a first bit or a second bit such as that may be generated using control bit functionality included within a product code encoder (e.g., implemented to perform 2-bit CRC check calculations) can be employed in such an embodiment.

2) To add 2 extra bits, first extra bit can be generated as a kind of parity of a portion of source data, or 1-bit out of 2-bit or 3-bit CRC checksum. Then, $2^{nd}$ extra bits can be added as did for adding (only) 1 extra bit.

For ITU-T FEC, the code redundancy is fixed as 6.69%. The following options may be considered:

Type-Ia: row code BCH (992, 960, t=3), column code BCH (1020, 988, t=3), there are 128 spare bits. They can be used as multiple CRC checksums or other purposes. The frame size is 31 times of 32640.

Type-Ib: row code BCH (988, 956, t=3), column code BCH (1020, 988, t=3), there is no spare bits. The frame size is not a multiple of 32640.

Type-II: row code BCH (987, 956, t=3), column code BCH (992, 960, t=3), there're 96 spare bits, which can be used as multiple CRC checksum or any other purpose to increase false detection capability and/or assist in error correction. The frame size is 30 times of 32640.

Type-III: row code BCH (988, 956, t=3), column code BCH (991, 960, t=3), there're 92 spare bits, which can be used as multiple CRC checksum or any other purpose to increase false detection capability and/or assist in error correction. The frame size is 30 times of 32640.

Type-IV: row code BCH (987, 956, t=3), column code BCH (959, 928, t=3), there're 27 spare bits.

Cyclically shifting row elements before encoding is optional for each of the above types. This can help hardware implementation and improve performance as well with proper shifting.

Our simulations show that for additive white Gaussian noise (AWGN) channel, binary phase shift keying (BPSK) modulation, Type-II code can achieve BER<$5\times10^{-10}$ at Eb/No=5.62 dB at 9 iterations. A BER=$1\times10^{-15}$ may be expected to be achieved at Eb/No=5.64 dB at 11 iterations or Eb/No=5.63 dB at 12 iterations.

In brief, the code has a net coding gain (NCG) of at least 15−5.63=9.37 dB (note: another candidate code may have a NCG of 9.35 dB at max of 30 iterations). If only 2 iterations are run, the NCG will be at least 15.0−8.0=7.0 dB at target BER=$1\times10^{-15}$ (the other mentioned code has a NCG of 6.7 dB at 2 iterations).

Decoding Scheme for Generic Product Codes:

For a binary product code as discussed above, decoding is generally started on column (or row) decoding, then row (or column) decoding and a number of decoding iterations are performed. To improve decoding performance, some of previous decoding results may be ignored as follows:

a) in column decoding phase, if a column code is deemed as un-decodable, the result from the previous decoding iteration of column decoding is completely or partially recovered while ignoring the preceding iteration of row decoding effect on this column code.

b) in row decoding phase, if a row code is deemed as un-decodable, the result from the previous iteration of row decoding is completely or partially recovered while completely or partially ignoring preceding iteration of column decoding effect on this row code.

Although this new decoding scheme will typically require some additional hardware in decoding, it can save approximately 3 iterations for a low target BER, which will ease real hardware implementation significantly for high speed applications and also provide for a savings in power consumption (such as may be highly desirable in embodiments seeking to effectuate energy conservation).

Memory Access Schemes for High-Speed Product Codes:

Decoding Scheme for Generic Product Codes:

FIG. 13 illustrates an embodiment 1300 of the iterative decoding flow for general product codes. A memory with multiple memory banks may be implemented column-wise. Similarly, row-wise memory banks may be implemented as well. For simplicity, the solution based on column-wise memory banks is discussed here, though the reader is reminded that this approach may also be applied using row-wise memory banks without departing from the scope and spirit of the invention.

Input data is sent to the memory, and column decoding is started at the same time. Then, the decoding operates to update the bits column-wise. Later, the data may be sent to row decoders in a skewed way as shown in FIG. 13 with the arrowed lines. After row decoding, row decoding correction queue for column decoding is sent. The row decoding queue will store bit locations for those bits that are corrected in the current iteration of row decoding. When data for column decoding is read, some of the bits are flipped (0 flipped to 1, or vice versa) based on the addresses provided by the queue. In the meantime, which bits were flipped are recorded for each column code. After column decoding, the column-wise based bits are updated based on the recorded data. Then, the iterative decoding process continues. It is also noted that the syndrome computation for either row decoding or column decoding may be performed in an efficient manner. For instance, the syndromes can be updated for each row code and each column code based on the most recently updated bit locations instead of re-computing the syndromes anew within each iteration.

FIG. 14 and FIG. 15 illustrate an embodiment 1400/1500 of the iterative modified decoding flow for general product codes. Two single-port separate memories are allocated. Initially input data is sent to column-wise memory banks, immediately sent to row-wise memory banks in a skewed way.

In the meantime, column code decoding begins. After that, column decoding correction queue is ready for row decoding. The data is read row-wise from row-wise memory banks. Again, some of the bits are flipped based on column decoding correction queue before sending data to row code decoders. At the same time, which bits were flipped are recorded during the time for each row code. After row decoding, the row decoding correction queue is sent for column decoding. In the meantime, the row-wise memory banks are updated based on the recorded flipped bits. Similar operations for decoding column codes are performed, and then, the iterative decoding process continues. While memory or memory banks are referred to here, it is of course noted that any desired form of data storage (e.g., one or more registers, random access memory, volatile memory, non-volatile memory, static memory, dynamic memory, flash memory, and/or any device that stores digital information) may alternatively be employed without departing from the scope and spirit of the invention. As may be understood, certain storage devices (e.g., register files) may have different (e.g., increased in the case of register files) real estate budgets, cost, etc. A designer has latitude to use any such device that stores digital information for a particular embodiment without departing from the scope and spirit of the invention.

FIG. 16A illustrates an embodiment of method for performing receiver processing of a signal received from a communication channel. Referring to method 1600 of FIG. 16A, the method 1600 begins by receiving a signal from a communication channel, as shown in a block 1610. The method 1600 continues by arranging a plurality of bits corresponding to the signal into a plurality of matrix formatted bits in accordance with a predetermined pattern, as shown in a block 1620. The method 1600 then operates by operating a plurality of row decoders for decoding a plurality of rows of the plurality of matrix formatted bits thereby generating estimates of information bits encoded within the plurality of rows, as shown in a block 1630.

The method 1600 continues by operating a plurality of column decoders for decoding a plurality of columns of the plurality of matrix formatted bits thereby generating estimates of information bits encoded within the plurality of columns, as shown in a block 1640. The method 1600 then operates by selectively recovering at least one estimate of information bits encoded within a row (/ column) from at least one prior row (/ column) decoding iteration for use in subsequent decoding performed by the plurality of column decoders when the row or column being deemed un-decodable in a current decoding iteration, as shown in a block 1650.

FIG. 16B and FIG. 16C illustrate embodiment of various methods for performing receiver processing of a signal received from a communication channel and reverting of bit values from previous decoding iterations. Referring to method 1601 of FIG. 16B, the method 1601 begins by within a current decoding iteration, determining that a row is deemed un-decodable, as shown in a block 1611. The method 1601 then operates by selectively reverting one or more bit values for the row from a previous row decoding iteration for use in subsequent column decoding, as shown in a block 1621.

Referring to method 1602 of FIG. 16C, the method 1602 begins by within a current decoding iteration, determining that a column is deemed un-decodable, as shown in a block 1612. The method 1601 then operates by selectively reverting one or more bit values for the column from a previous decoding iteration for use in subsequent row decoding, as shown in a block 1622.

In these embodiments, the value of one or more bits from the current row (/column) decoding iteration may be changed back to what it was during a previous row (/ column) decoding iteration. In some instances, all of the bits in the row (/ column) that were corrected in the previous column (/ row) decoding iteration, for that respective row (/ column), are merely reverted for use in subsequent decoding. Alternatively, as few as one or more of the bits from the current decoding iteration are reverted for use in subsequent decoding.

FIG. 17A illustrates an embodiment of a method 1700 for performing product encoding involving including cyclic redundancy check (CRC) therein. Referring to method 1700 of FIG. 17A, the method 1700 begins by arranging a plurality of information bits into matrix formatted bits, as shown in a block 1710. This may be viewed arranging a bit sequence into rows and columns thereby generating the matrix formatted bits. The method 1700 continues by employing a first ECC for encoding rows of matrix formatted bits thereby generating first pluralities of parity bits, as shown in a block 1720. The method 1700 then operates by selectively adding one or more control or extra bits (e.g., CRC, control bit, parity bit of source data, etc.) to at least one of the first pluralities of parity bits, as shown in block 1730.

The method 1700 continues by employing a second ECC for encoding columns of matrix formatted bits thereby generating second pluralities of parity bits, as shown in a block 1740. In some embodiments, the first ECC and the second ECC are the same ECC. In even other embodiments, different ECCs are respectively employed for encoding the different rows and column of the matrix formatted bits thereby generating respective pluralities of parity bits.

The method 1701 continues by selectively adding one or more control or extra bits (e.g., CRC, control bit, parity bit of source data, etc.) to at least one of the second pluralities of parity bits, as shown in a block 1750.

The method 1700 then operates by arranging the first pluralities of parity bits, the second pluralities of parity bits, and the one or more control or extra bits thereby generating an output bit sequence, as shown in a block 1760. This output bit sequence then is employed to generate a signal that is suitable for being launched into a communication channel.

FIG. 17B illustrates an embodiment of a method 1701 for decoding processing of a product coded signal. Referring to method 1701 of FIG. 17B, the method 1701 begins by performing column decoding of matrix formatted bits (e.g., corresponding to signal received from communication channel) and recording which bits, if any, are flipped during column decoding, as shown in a block 1711. The method 1701 then operates by updating matrix formatted bits to indicate flipped bits (if any) based on column decoding, as shown in a block 1721.

The method 1701 continues by performing row decoding of updated matrix formatted bits (including any flipped bits) and recording which additional bits, if any, are flipped during column decoding, as shown in a block 1731. The method 1701 then operates by updating matrix formatted bits to indicate flipped bits (if any) based on row decoding, as shown in a block 1741. The method 1701 continues by employing most recently updated matrix formatted bits to make estimates of information bits encoded therein, as shown in a block 1751.

In this embodiment, it is noted that column decoding is performed firstly and row decoding is performed secondly in a decoding iteration in this embodiment. In other embodiments, row decoding may instead be performed firstly and column decoding may be performed secondly in a given decoding iteration.

It is noted that the various modules (e.g., encoding modules, decoding modules, symbol mappers, metric generators, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

It is also noted that any of the connections or couplings between the various modules, circuits, functional blocks, components, devices, etc. within any of the various diagrams or as described herein may be of any type as desired such as a direct connection, an indirection connection (e.g., with one or more intervening components there between), a communicative coupling, etc. without departing from the scope and spirit of the invention.

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Various aspects of the present invention have been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, various aspects of the present invention are not limited to such embodiments. It will be obvious to one of average skill in the art that various changes and modifications may be practiced within the spirit and scope of the invention, as limited only by the scope of the appended claims.

What is claimed is:

1. A communication device comprising:
a communication interface;
a memory configured to store a plurality of matrix formatted bits; and
a processor configured to:
receive, via the communication interface, a signal transmitted from another communication device via a communication channel;
process the signal to generate the plurality of matrix formatted bits;
perform row decoding of the plurality of matrix formatted bits based on bit-flipping of one or more of the plurality of matrix formatted bits to generate first soft estimates;
perform column decoding of the plurality of matrix formatted bits to generate second soft estimates based on the bit-flipping of the one or more of the plurality of matrix formatted bits; and
generate estimates of bits encoded in the signal based on at least one of the first and second soft estimates.

2. The communication device of claim 1 further comprising:
the processor configured to:
read rows of the plurality of matrix formatted bits from the memory including bit-flipping the one or more of the plurality of matrix formatted bits;
write the first soft estimates to the memory to update first one or more of the plurality of matrix formatted bits;
read columns of the plurality of matrix formatted bits from the memory; and
write the second soft estimates to the memory to update second one or more of the plurality of matrix formatted bits.

3. The communication device of claim 1 further comprising:
the processor configured to employ other prior soft estimates from a prior row decoding iteration when a row associated with the first soft estimates is un-decodable in a current column decoding iteration.

4. The communication device of claim 1 further comprising:
the processor configured to:
perform first cyclic redundancy check (CRC) and first forward error correction (FEC) row decoding of the plurality of matrix formatted bits to generate first soft estimates; and
perform second CRC and second FEC column decoding of the plurality of matrix formatted bits to generate second soft estimates.

5. The communication device of claim 1 further comprising:
the processor configured to generate estimates of the bits encoded in the signal based on at least one of the first and second soft estimates using BCH (Bose and Ray-Chaudhuri, and Hocquenghem) code decoding or Reed-Solomon (RS) code decoding.

6. The communication device of claim 1 further comprising:
the processor including a matrix formatting module configured to process the signal to generate the plurality of matrix formatted bits;
the processor including a plurality of row decoders configured to perform the row decoding of the plurality of matrix formatted bits to generate the first soft estimates; and
the processor including a plurality of column decoders configured to perform column decoding of the plurality of matrix formatted bits to generate the second soft estimates.

7. The communication device of claim 1 further comprising:
the memory including a plurality of row-wise or column-wise arranged memory banks configured to store the plurality of matrix formatted bits.

8. The communication device of claim 1 further comprising:
the communication interface configured to support communications within at least one of a satellite communication system, a wireless communication system, a wired communication system, or a fiber-optic communication system.

9. A communication device comprising:
a communication interface;
a memory configured to store a plurality of matrix formatted bits; and a processor configured to:
   receive, via the communication interface, a signal transmitted from another communication device via a communication channel;
   process the signal to generate the plurality of matrix formatted bits;
   perform row decoding of the plurality of matrix formatted bits based on bit-flipping of one or more of the plurality of matrix formatted bits to generate first soft estimates;
   perform column decoding of the plurality of matrix formatted bits to generate second soft estimates based on the bit-flipping of the one or more of the plurality of matrix formatted bits including to employ other prior soft estimates from a prior row decoding iteration when a row associated with the first soft estimates is un-decodable in a current column decoding iteration; and
   generate estimates of bits encoded in the signal based on at least one of the first and second soft estimates.

10. The communication device of claim 9 further comprising:
   the processor configured to:
      perform first cyclic redundancy check (CRC) and first forward error correction (FEC) row decoding of the plurality of matrix formatted bits to generate first soft estimates; and
      perform second CRC and second FEC column decoding of the plurality of matrix formatted bits to generate second soft estimates.

11. The communication device of claim 8 further comprising:
   the processor configured to generate estimates of the bits encoded in the signal based on at least one of the first and second soft estimates using BCH (Bose and Ray-Chaudhuri, and Hocquenghem) code decoding or Reed-Solomon (RS) code decoding.

12. The communication device of claim 9 further comprising:
   the processor including a matrix formatting module configured to process the signal to generate the plurality of matrix formatted bits;
   the processor including a plurality of row decoders configured to perform the row decoding of the plurality of matrix formatted bits to generate the first soft estimates; and
   the processor including a plurality of column decoders configured to perform column decoding of the plurality of matrix formatted bits to generate the second soft estimates.

13. The communication device of claim 9 further comprising:
   the communication interface configured to support communications within at least one of a satellite communication system, a wireless communication system, a wired communication system, or a fiber-optic communication system.

14. A method for execution by a communication device, the method comprising:
   processing a signal to generate the plurality of matrix formatted bits;
   performing row decoding of the plurality of matrix formatted bits based on bit-flipping of one or more of the plurality of matrix formatted bits to generate first soft estimates;
   performing column decoding of the plurality of matrix formatted bits to generate second soft estimates based on the bit-flipping of the one or more of the plurality of matrix formatted bits; and
   generating estimates of bits encoded in the signal based on at least one of the first and second soft estimates.

15. The method of claim 14 further comprising:
   reading rows of the plurality of matrix formatted bits from a memory including bit-flipping the one or more of the plurality of matrix formatted bits;
   writing the first soft estimates to the memory to update first one or more of the plurality of matrix formatted bits;
   reading columns of the plurality of matrix formatted bits from the memory; and
   writing the second soft estimates to the memory to update second one or more of the plurality of matrix formatted bits.

16. The method of claim 14 further comprising:
   employing other prior soft estimates from a prior row decoding iteration when a row associated with the first soft estimates is un-decodable in a current column decoding iteration.

17. The method of claim 14 further comprising:
   performing first cyclic redundancy check (CRC) and first forward error correction (FEC) row decoding of the plurality of matrix formatted bits to generate first soft estimates; and
   performing second CRC and second FEC column decoding of the plurality of matrix formatted bits to generate second soft estimates.

18. The method of claim 14 further comprising:
   generating estimates of the bits encoded in the signal based on at least one of the first and second soft estimates using BCH (Bose and Ray-Chaudhuri, and Hocquenghem) code decoding or Reed-Solomon (RS) code decoding.

19. The method of claim 14 further comprising:
   employing a plurality of row-wise or column-wise arranged memory banks of the communication device configured to store the plurality of matrix formatted bits.

20. The method of claim 14 further comprising:
   operating the communication interface of the communication device to support communications within at least one of a satellite communication system, a wireless communication system, a wired communication system, or a fiber-optic communication system.

* * * * *